United States Patent
Coursey et al.

(10) Patent No.: US 9,939,336 B2
(45) Date of Patent: Apr. 10, 2018

(54) SYSTEMS AND METHODS FOR AUTO-CALIBRATION OF RESISTIVE TEMPERATURE SENSORS

(71) Applicant: Canon U.S. Life Sciences, Inc., Rockville, MD (US)

(72) Inventors: Johnathan S. Coursey, Rockville, MD (US); Kenton C. Hasson, Germantown, MD (US); Gregory H. Owen, Clarksburg, MD (US)

(73) Assignee: Canon U.S. Life Sciences, Inc., Rockville, MD (US)

( * ) Notice: Subject to any disclaimer, the term of this patent is extended or adjusted under 35 U.S.C. 154(b) by 624 days.

(21) Appl. No.: 14/451,214

(22) Filed: Aug. 4, 2014

(65) Prior Publication Data
US 2015/0127288 A1    May 7, 2015

Related U.S. Application Data

(60) Continuation of application No. 13/653,836, filed on Oct. 17, 2012, now Pat. No. 8,794,831, which is a
(Continued)

(51) Int. Cl.
*G01K 7/16* (2006.01)
*G01K 7/00* (2006.01)
(Continued)

(52) U.S. Cl.
CPC ............... *G01K 19/00* (2013.01); *B01L 7/52* (2013.01); *G01K 7/16* (2013.01); *G01K 7/20* (2013.01); *G01K 15/00* (2013.01); *G01K 15/005* (2013.01)

(58) Field of Classification Search
CPC ........... G01K 7/16; G01K 15/00; C12M 1/36; C12M 1/38
(Continued)

(56) References Cited

U.S. PATENT DOCUMENTS 3,045,488 A   7/1962 Jurs, Jr. et al.
3,791,214 A   2/1974 Keith
(Continued)

FOREIGN PATENT DOCUMENTS

WO     2005/075683 A1   8/2005

OTHER PUBLICATIONS

Lagally et al., "Single-Molecule DNA Amplification and Analysis in an Integrated Microfluidic Device," Analytical Chemistry, 73(3), pp. 565-570 (2001).
(Continued)

*Primary Examiner* — R. A. Smith
(74) *Attorney, Agent, or Firm* — Rothwell, Figg, Ernst & Manbeck, P.C.

(57) ABSTRACT

The invention relates to systems and methods for calibrating and using resistance temperature detectors. In one embodiment, the system includes a calibration circuit comprising a resistance temperature detector in a bridge circuit with at least one potentiometer, and a programmable gain amplifier coupled to the bridge circuit. Embodiments of the invention further comprise methods for calibrating the bridge circuit and the programmable gain amplifier for use with the resistance temperature detector and methods for determining the self heating voltage of the bridge circuit.

17 Claims, 22 Drawing Sheets

Related U.S. Application Data division of application No. 12/437,775, filed on May 8, 2009, now Pat. No. 8,337,082.

(51) Int. Cl.
  *B01L 7/00* (2006.01)
  *G01K 19/00* (2006.01)
  *G01K 7/20* (2006.01)
  *G01K 15/00* (2006.01)

(58) Field of Classification Search
  USPC .................. 374/1, 114, 170, 171, 172, 185; 435/283.1, 286.1
  See application file for complete search history.

(56) References Cited

U.S. PATENT DOCUMENTS

| | | | |
|---|---|---|---|
| 3,882,725 | A | 5/1975 | Rao et al. |
| 4,143,550 | A | 3/1979 | Kobayashi |
| 4,218,916 | A | 8/1980 | Mutziger |
| 5,030,849 | A | 7/1991 | Brokaw |
| 5,207,094 | A | 5/1993 | Gmelin et al. |
| 5,719,378 | A | 2/1998 | Jackson, Jr. et al. |
| 5,767,259 | A | 6/1998 | Albagli et al. |
| 5,772,321 | A | 6/1998 | Rhodes |
| 5,795,069 | A | 8/1998 | Mattes et al. |
| 6,002,747 | A | 12/1999 | Eftechiou |
| 6,388,449 | B1 | 5/2002 | Ramsden |
| 6,459,335 | B1 | 10/2002 | Darmawaskita et al. |
| 6,519,546 | B1 | 2/2003 | Eryurek et al. |
| 6,813,570 | B2 | 11/2004 | Gee |
| 6,935,172 | B2 | 8/2005 | Horie et al. |
| 6,946,848 | B2 | 9/2005 | Tauber et al. |
| 6,960,437 | B2 | 11/2005 | Enzelberger et al. |
| 7,058,532 | B1 | 6/2006 | Yamagishi et al. |
| 8,029,187 | B2 | 10/2011 | Taylor et al. |
| 8,337,082 | B2 | 12/2012 | Coursey et al. |
| 8,794,831 | B2 * | 8/2014 | Coursey et al. ......... G01K 7/20 374/1 |
| 2003/0012252 | A1 | 1/2003 | Bender |
| 2005/0042639 | A1 | 2/2005 | Knapp et al. |

OTHER PUBLICATIONS

Kopp et al., "Chemical Amplification: Continuous-Flow PCR on a Chip," Science, 280(15), pp. 1046-1048 (1998).

Park et al., "Cylindrical compact thermal-cycling device for continuous-flow polymerase chain reaction," Analytical Chemistry, 75, pp. 6029-6033 (2003).

Henry, C.D., Nucleate Pool Boiling Characteristics from a Horizontal Microheater Array, PhD. Dissertation, Univ. of Maryland, 331 pages (2005).

* cited by examiner

Programmable Bridge Circuit with
Programmable Amplification 1 of 8

SYSTEMS AND METHODS FOR AUTO-CALIBRATION OF RESISTIVE TEMPERATURE SENSORS

CLAIM OF PRIORITY TO RELATED APPLICATION

This application is a continuation of U.S. patent application Ser. No. 13/653,836, filed Oct. 17, 2012, now U.S. Pat. No. 8,794,831, issued Aug. 5, 2014, which is a divisional of U.S. patent application Ser. No. 12/437,775, filed May 8, 2009, now U.S. Pat. No. 8,337,082, issued Dec. 25, 2012, each of which are incorporated herein by reference in their entireties.

BACKGROUND

Field of Invention

The present invention relates to microfluidic devices and temperature control of the microfluidic devices for performing biological reactions. In some embodiments, the present invention relates to systems and methods for calibrating and using a resistance temperature detector for use in a microfluidic device.

Discussion of the Background

The detection of nucleic acids is central to medicine, forensic science, industrial processing, crop and animal breeding, and many other fields. The ability to detect disease conditions (e.g., cancer), infectious organisms (e.g., HIV), genetic lineage, genetic markers, and the like, is ubiquitous technology for disease diagnosis and prognosis, marker assisted selection, identification of crime scene features, the ability to propagate industrial organisms and many other techniques. Determination of the integrity of a nucleic acid of interest can be relevant to the pathology of an infection or cancer.

One of the most powerful and basic technologies to detect small quantities of nucleic acids is to replicate some or all of a nucleic acid sequence many times, and then analyze the amplification products. Polymerase chain reaction (PCR) is a well-known technique for amplifying DNA. With PCR, one can produce millions of copies of DNA starting from a single template DNA molecule. PCR includes phases of "denaturation," "annealing," and "extension." These phases are part of a cycle which is repeated a number of times so that at the end of the process there are enough copies to be detected and analyzed. For general details concerning PCR, see Sambrook and Russell, *Molecular Cloning—A Laboratory Manual* (3rd Ed.), Vols. 1-3, Cold Spring Harbor Laboratory, Cold Spring Harbor, N.Y. (2000); *Current Protocols in Molecular Biology*, F. M. Ausubel et al., eds., Current Protocols, a joint venture between Greene Publishing Associates, Inc. and John Wiley & Sons, Inc., (supplemented through 2005) and *PCR Protocols A Guide to Methods and Applications*, M. A. Innis et al., eds., Academic Press Inc. San Diego, Calif. (1990).

The PCR process phases of denaturing, annealing, and extension occur at different temperatures and cause target DNA molecule samples to replicate themselves. Temperature cycling (thermocyling) requirements vary with particular nucleic acid samples and assays. In the denaturing phase, a double stranded DNA (dsDNA) is thermally separated into single stranded DNA (ssDNA). During the annealing phase, primers are attached to the single stand DNA molecules. Single strand DNA molecules grow to double stranded DNA again in the extension phase through specific bindings between nucleotides in the PCR solution and the single strand DNA. Typical temperatures are 95° C. for denaturing, 55° C. for annealing, and 72° C. for extension. The temperature is held at each phase for a certain amount of time which may be a fraction of a second up to a few tens of seconds. The DNA is doubled at each cycle; it generally takes 20 to 40 cycles to produce enough DNA for the applications. To have good yield of target product, one has to accurately control the sample temperatures at the different phases to a specified degree.

More recently, a number of high throughput approaches to performing PCR and other amplification reactions have been developed, for example, involving amplification reactions in microfluidic devices, as well as methods for detecting and analyzing amplified nucleic acids in or on the devices. Thermal cycling of the sample for amplification is usually accomplished in one of two methods. In the first method, the sample solution is loaded into the device and the temperature is cycled in time, much like a conventional PCR instrument. In the second method, the sample solution is pumped continuously through spatially varying temperature zones. See, for example, Lagally et al. (*Analytical Chemistry* 73:565-570 (2001)), Kopp et al. (*Science* 280:1046-1048 (1998)), Park et al. (*Analytical Chemistry* 75:6029-6033 (2003)), Hahn et al. (WO 2005/075683), Enzelberger et al. (U.S. Pat. No. 6,960,437) and Knapp et al. (U.S. Patent Application Publication No. 2005/0042639).

Many detection methods require a large number of copies (millions, for example) of the original DNA molecule, in order for the DNA to be characterized. Because the total number of cycles is fixed with respect to the number of desired copies, the only way to reduce the process time is to reduce the length of a cycle. Thus, the total process time may be significantly reduced by rapidly heating and cooling samples to process phase temperatures while accurately maintaining those temperatures for the process phase duration.

Accordingly, what is desired is a system and method for rapidly and accurately changing process temperatures in PCR and thermal melt processes.

SUMMARY

In one aspect, the present invention provides an improved tunable temperature measurement circuit. In some embodiments, the improved tunable temperature measurement circuit includes a source node maintained at a predetermined source voltage; a ground node maintained at a predetermined ground voltage; and a bridge circuit coupled to programmable gain instrumentation amplifier. In one embodiment, the bridge circuit comprises (1) a first resistance temperature detector connected between the source node and a first measurement node, (2) a first reference resistor connected between the first measurement node and the ground node, (3) a potentiometer (e.g. a programmable digital potentiometer) connected between the source node and a reference node, and (4) a scaling resistor connected between the reference node and the ground node. The programmable gain instrumentation amplifier may be connected so that a first input to the first programmable gain instrumentation amplifier is connected to the reference node, a second input to the first programmable gain instrumentation amplifier is connected to the first measurement node, and the output of the first programmable gain instrumentation amplifier is representative of the temperature sensed by the first resistance temperature detector. In some embodiments of the improved tunable temperature measurement circuit, one or more of the first reference resistor and the scaling resistor are also potentiometers.

In some embodiments, the improved tunable temperature measurement circuit also includes a capacitor connected in parallel with the scaling resistor and/or a low-pass filter coupled to the output of the first programmable gain instrumentation amplifier.

In some embodiments, the improved tunable temperature measurement circuit also includes a bypass circuit connected between the first measurement node and the ground node, wherein the bypass circuit comprises a bypass switch (e.g., a digital switch) in series with a bypass resistor. In some embodiments, the bypass circuit is configured to pulse width modulate a current passing through the first resistance temperature detector.

In some embodiments, the improved tunable temperature measurement circuit also includes a power control circuit connected to the first measurement node, wherein the power control circuit comprises a bottom power switch connected between the measurement node and a bottom power node maintained at the predetermined source voltage, and a grounding switch connected in series with a bypass resistor between the measurement node and the ground node. In some embodiments, the tunable temperature measurement circuit may also include a shunt circuit connected between the reference resistor and the ground node, wherein the shunt circuit comprises a shunt switch in parallel with a shunt resistor.

In some embodiments, the improved tunable temperature measurement circuit also includes: a selector switch disposed in between the first resistance temperature detector and the first measurement node; and one or more second resistance temperature detectors connected to the source node in parallel with the first resistance temperature detector. In these embodiments, the selector switch may be configured to connect one of the first resistance temperature detector and the one or more second resistance temperature detectors to the measurement node.

In some embodiments, the improved tunable temperature measurement circuit also includes: a second resistance temperature detector connected between the source node and a second measurement node, a second reference resistor connected between the second measurement node and the ground; and a second programmable gain instrumentation amplifier. In these embodiments, a first input to the second programmable gain instrumentation amplifier is connected to the reference node, a second input to the second programmable gain instrumentation amplifier is connected to the second measurement node, and the output of the second programmable gain instrumentation amplifier is representative of the temperature sensed by the second resistance temperature detector. In some embodiments, the improved tunable temperature measurement circuit also includes a unity gain buffer, wherein the reference node is connected to the programmable gain instrumentation amplifiers via the unity gain buffer.

In another aspect, the invention provides a method of calibrating the potentiometer in an improved tunable temperature measurement system including the improved tunable temperature measurement circuit. In some embodiments, the method of calibrating the potentiometer includes the steps of: (a) setting the resistance value of the potentiometer to a first resistance value; (b) setting the gain of the first programmable gain instrumentation amplifier to a first gain value; (c) measuring the voltage output from the first programmable gain instrumentation amplifier; (d) in the case that the measured voltage is above a predetermined target value (e.g., a value selected to maximize the signal to noise ratio in the output of the first programmable gain instrumentation amplifier), adjusting the resistance value of the potentiometer in a first direction; (e) in the case that the measured voltage is below the predetermined target value, adjusting the resistance value of the potentiometer in a direction opposite to the first direction; and (f) repeating steps (c) through (e) until the measured voltage from the first programmable gain instrumentation amplifier is equal to the predetermined target value.

In some embodiments, the method of calibrating the potentiometer in an improved tunable temperature measurement system of also includes the steps of: (g) after performing step (f), storing the resistance value of the potentiometer in an electronic memory; (h) associating the stored resistance value with an identifier corresponding to the first resistance temperature detector; (i) repeating steps (a) through (h) for a plurality of resistance temperature detectors to create a plurality of associations between resistance temperature detectors and resistance values; (j) detecting the presence of one of the plurality of resistance temperature detectors; and (k) setting the resistance value of the potentiometer to the resistance value associated with the one of the plurality of resistance temperature detectors. In some embodiments, the step of detecting the presence of one of the plurality of resistance temperature detectors comprises reading a machine readable bar code or an RFID tag from a platform chip containing the one of the plurality of resistance temperature detectors.

In another aspect, the invention provides a method of calibrating the self-heating properties of the improved tunable temperature measurement system. In some embodiments, the method of calibrating the self-heating properties includes: (a) setting the predetermined source voltage to a first source voltage value corresponding to a desired operational supply voltage; (b) setting the gain of the first programmable gain instrumentation amplifier to a first gain value corresponding to a desired operational gain value; (c) measuring the voltage output from the first programmable gain instrumentation amplifier; (d) determining a first ratio of the output from the first programmable gain instrumentation amplifier to the source node voltage multiplied by the gain of the first programmable gain instrumentation amplifier; (e) decreasing the predetermined source voltage to a new source voltage value; (f) measuring the voltage output from the first programmable gain instrumentation amplifier; (g) determining a new ratio of the output from the first programmable gain instrumentation amplifier to the measured source node voltage multiplied by the gain of the first programmable gain instrumentation amplifier; (h) determining an asymptote ratio by repeating steps (e) through (g) until the change of the new ratio determined at (g) between subsequent iterations is beneath a predetermined threshold; and (i) determining an operational self-heating voltage difference by multiplying the desired operational gain value by the difference between the first ratio and the asymptote ratio.

In some embodiments of the method of calibrating the self-heating properties of the improved tunable temperature measurement system, steps (c) and (f) further comprise measuring the voltage at the source node; and steps (d) and (g) use the measured voltage at the source node as the source node voltage.

In some embodiments of the method of calibrating the self-heating properties of the improved tunable temperature measurement system, step (e) further comprises increasing the gain of the first programmable gain instrumentation amplifier to a new gain value such that the product of the first source voltage value and the first gain value is equal to the product of the new source voltage value and the new gain value.

In another aspect, the invention provides a method for performing thermal calibration of the improved tunable temperature measurement system comprising the steps of: (a) setting the predetermined source voltage to a desired operational supply voltage; (b) setting the gain of the first programmable gain instrumentation amplifier to a desired operational gain value; (c) bringing the resistance temperature detector to a known temperature (e.g. by utilizing an externally controlled heating device that has been independently calibrated such as a Peltier device or a resistive heater); (d) measuring a voltage output from the first programmable gain instrumentation amplifier; (e) storing the measured output voltage in an electronic memory in association with the known temperature; (f) repeating steps (c) through (e) to store a plurality of associations between known temperatures and corresponding measured output voltages; and (g) utilizing the stored associations to calibrate the circuit for thermal variations (e.g. by utilizing a look up table for the plurality of known temperatures or by calculating a suitable curve to interpolate output voltage between the known temperatures).

In another aspect, the invention provides a system of controlling the temperature of a microfluidic device for performing biological reactions. In some embodiments, the system of controlling the temperature of a microfluidic device for performing biological reactions includes an improved tunable temperature measurement circuit comprising a source node maintained at a predetermined source voltage; a ground node maintained at a predetermined ground voltage; and a bridge circuit coupled to programmable gain instrumentation amplifier. The bridge circuit comprises (1) a first resistance temperature detector connected between the source node and a first measurement node, (2) a first reference resistor connected between the first measurement node and the ground node, (3) a potentiometer connected between the source node and a reference node, and (4) a scaling resistor connected between the reference node and the ground node. The programmable gain instrumentation amplifier may be connected so that a first input to the first programmable gain instrumentation amplifier is connected to the reference node, a second input to the first programmable gain instrumentation amplifier is connected to the first measurement node, and the output of the first programmable gain instrumentation amplifier is representative of the temperature sensed by the first resistance temperature detector.

In some embodiments, the system of controlling the temperature of a microfluidic device for performing biological reactions includes a bridge adjustment controller configured to: (a) set the resistance value of the potentiometer to a first resistance value; (b) set the gain of the first programmable gain instrumentation amplifier to a first gain value; (c) measure the voltage output from the first programmable gain instrumentation amplifier; (d) in the case that the measured voltage is above a predetermined target value, adjust the resistance value of the potentiometer in a first direction; (e) in the case that the measured voltage is below the predetermined target value, adjust the resistance value of the potentiometer in a direction opposite to the first direction; and (f) repeat steps (c) through (e) until the measured voltage from the first programmable gain instrumentation amplifier is equal to the predetermined target value.

In some embodiments, the system of controlling the temperature of a microfluidic device for performing biological reactions includes a self-heating calibration controller configured to: (a) set the predetermined source voltage to a first source voltage value corresponding to a desired operational supply voltage; (b) set the gain of the first programmable gain instrumentation amplifier to a first gain value corresponding to a desired operational gain value; (c) measure the voltage output from the first programmable gain instrumentation amplifier; (d) determine a first ratio of the output from the first programmable gain instrumentation amplifier to the source node voltage multiplied by the gain of the first programmable gain instrumentation amplifier; (e) decrease the predetermined source voltage to a new source voltage value; (f) measure the voltage output from the first programmable gain instrumentation amplifier; (g) determine a new ratio of the output from the first programmable gain instrumentation amplifier to the measured source node voltage multiplied by the gain of the first programmable gain instrumentation amplifier; (h) determine an asymptote ratio by repeating steps (e) through (g) until the change of the new ratio determined at (g) between subsequent iterations is beneath a predetermined threshold; and (i) determine an operational self-heating voltage difference by multiplying the desired operational gain value by the difference between the first ratio and the asymptote ratio.

In some embodiments, the system of controlling the temperature of a microfluidic device for performing biological reactions includes a thermal calibration controller configured to: (a) set the predetermined source voltage to a desired operational supply voltage; (b) set the gain of the first programmable gain instrumentation amplifier to a desired operational gain value; (c) bring the resistance temperature detector to a known temperature; (d) measure a voltage output from the first programmable gain instrumentation amplifier; (e) store the measured output voltage in an electronic memory in association with the known temperature; (f) repeat steps (c) through (e) to store a plurality of associations between known temperatures and corresponding measured output voltages; and (g) utilize the stored associations to calibrate the circuit for thermal variations The above and other embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements. Additionally, the left-most digit(s) of a reference number identifies the drawing in which the reference number first appears.

DETAILED DESCRIPTION OF PREFERRED EMBODIMENTS

Figure 1:
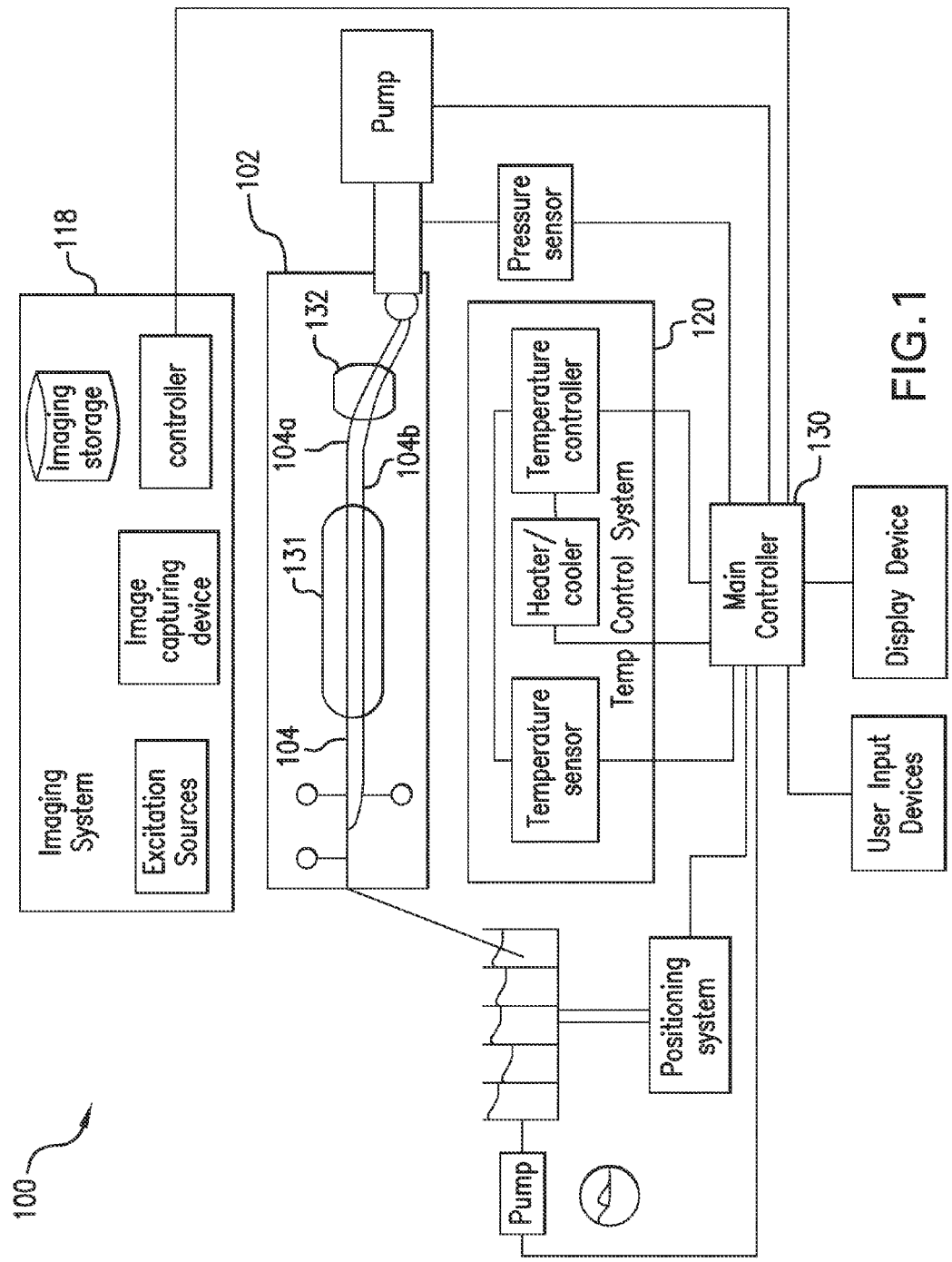
FIG. 1 is a block diagram of a system for performing PCR and thermal melt analysis.

FIG. 1 illustrates a functional block diagram of a system 100 for performing PCR and thermal melt analysis according to some embodiments of the invention. As illustrated in FIG. 1, system 100 may include a microfluidic device 102. Microfluidic device 102 may include one or more microfluidic channels 104. In the examples shown, device 102 includes two microfluidic channels, channel 104a and channel 104b. Although only two channels are shown in the exemplary embodiment, it is contemplated that device 102 may have fewer than two or more than two channels. For example, in some embodiments, device 102 includes eight channels 104.

Device 102 may include two DNA processing zones, a DNA amplification zone 131, sometimes referred to herein as PCR zone 131, and a DNA melting zone 132. A DNA sample traveling through the PCR zone 131 may undergo PCR, and a DNA sample passing through melt zone 132 may undergo high resolution thermal melting. As illustrated in FIG. 1, PCR zone 131 includes a first portion of channels 104 and melt zone 132 includes a second portion of channels 104, which is down stream from the first portion.

In order to achieve PCR for a DNA sample flowing through the PCR zone 131, the temperature of the sample must be cycled, as is well known in the art. Accordingly, in some embodiments, system 100 includes a temperature control system 120. The temperature control system 120 may include a temperature sensor, a heater/cooler, and a temperature controller. In some embodiments, a temperature control system 120 is interfaced with a main controller 130 so that main controller 130 can control the temperature of the samples flowing through the PCR zone and the melting zone.

Main controller 130 may be connected to a display device for displaying a graphical user interface. Main controller 130 may also be connected to user input devices which allow a user to input data and commands into main controller 130.

To monitor the PCR process and the melting process that occur in PCR zone 131 and melt zone 132, respectively, system 100 may include an imaging system 118. Imaging system 118 may include an excitation source, an image capturing device, a controller, and an image storage unit. Other aspects of a suitable system in accordance with some aspects of the invention are disclosed in U.S. patent application Ser. No. 11/770,869, incorporated herein by reference in its entirety.

Figure 2:
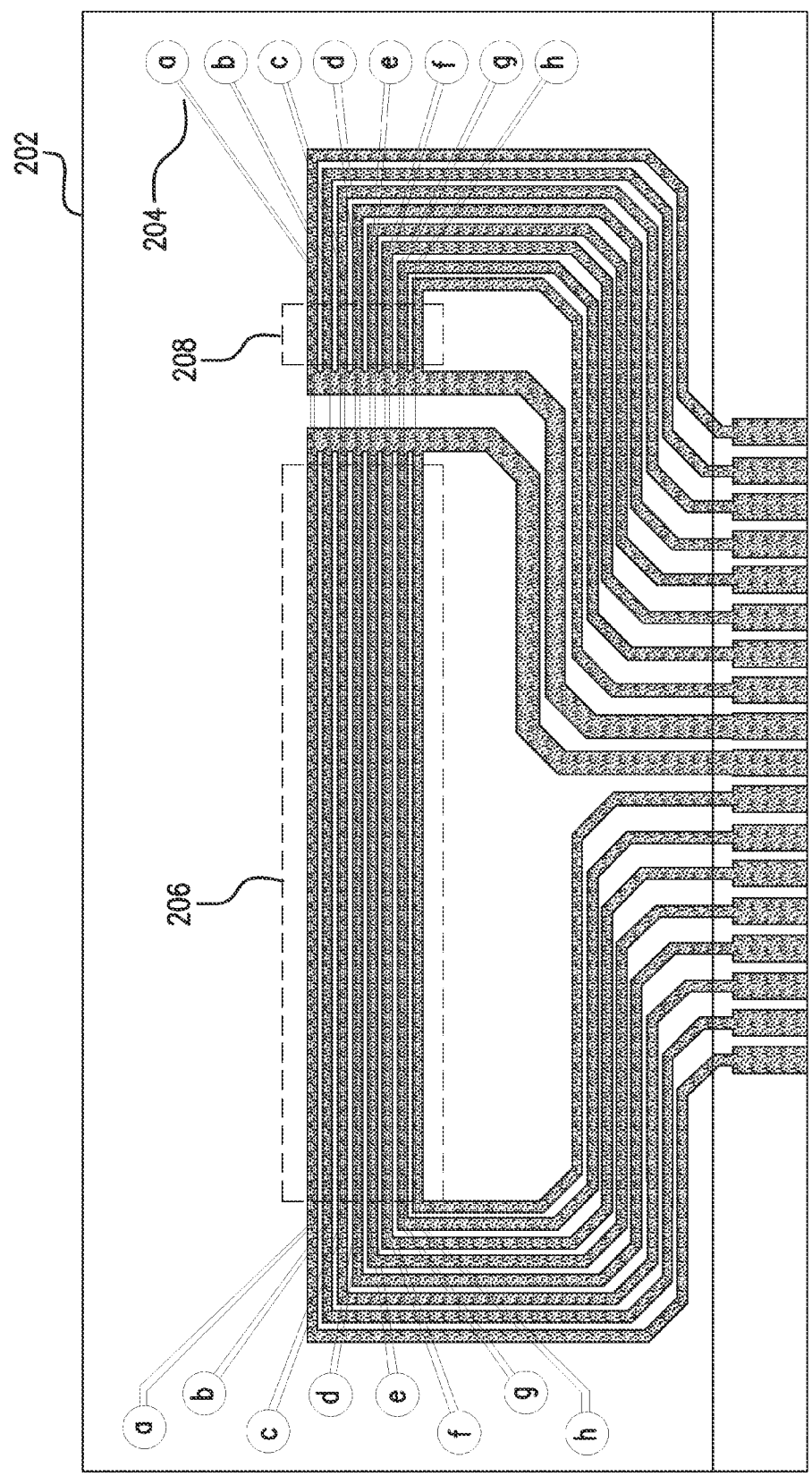
FIG. 2 is a diagram of a microfluidic chip.

FIG. 2 illustrates another embodiment of a microfluidic device 202. As shown in FIG. 2, the microfluidic chip 202 may comprise a plurality of microfluidic channels 204a-204h that traverse heater/sensor regions 206, 208. The plurality of microfluidic channels 204a-204h may be disposed in alignment with heaters/sensors in a first region 206 configured to perform PCR and may also be disposed in alignment with heaters/sensors in a second region 208 configured to perform high resolution thermal melting. In some embodiments, heaters/sensors in the heater/sensor regions 206, 208 comprise resistance temperature detectors ("RTD"s). The RTDs may be composed from a variety of materials, for example, the RTDs may be platinum, copper, and/or nickel RTDs.

The temperature-dependent resistance Rh of an RTD may be related to its temperature by the linear approximation shown in Equation 1:

$$Rh(T) = Rh(T_0) \cdot [1 + \alpha(T - T_0)] \qquad \text{Equation 1}$$

In equation 1, $Rh(T_0)$ is a known resistance of the RTD at a predetermined temperature $T_0$, T is the current temperature of the RTD, and α is a linear temperature coefficient of resistance.

As the temperature T of the RTD increases, its resistance Rh will also increase according to Equation 1. Therefore, an accurate measurement of Rh(T) can indicate the temperature T of the RTD as shown in Equation 2 below:

$$T = T_0 + \frac{\frac{Rh(T)}{Rh(T_0)} - 1}{\alpha} \qquad \text{Equation 2}$$

One method of measuring the resistance Rh of the RTD is with a simple voltage dividing circuit. In some embodiments of a voltage dividing circuit, the RTD is placed in series with a reference resistor having a resistance Ri. The reference resistor may comprise a single resistive element, or in some embodiments may comprise a plurality of discrete elements that, in combination, exhibit a relatively constant resistance value. The RTD in series with the reference resistor are connected between a known voltage difference (e.g., $V_{cc}$–$V_G$), and a voltage measurement $V_i$ is taken at a point between the RTD and the reference resistor. In this configuration, the resistance Rh of the RTD can be calculated with the following relations:

$$(V_i - V_G) = (V_{cc} - V_G) \cdot \frac{Ri}{Rh(T) + Ri} \qquad \text{Equation 3}$$

$$Rh(T) = Ri \cdot \left[ \frac{(V_{cc} - V_G)}{(V_i - V_G)} - 1 \right] \qquad \text{Equation 4}$$

By substituting the expression for Rh from equation 4 into equation 2, one can determine the temperature of the RTD by measuring the voltage $V_i$:

$$T = T_0 + \frac{\frac{Ri}{Rh(T_0)} \cdot \left[ \frac{(V_{cc} - V_G)}{(V_i - V_G)} - 1 \right] - 1}{\alpha} \qquad \text{Equation 5}$$

Accordingly, one can accurately determine the temperature T of the RTD when $Rh(T_0)$, $\alpha$, $V_{cc}$, and $V_G$ are known.

It is desirable to maximize the sensitivity of the measurement to changes in temperature (i.e., maximize $\Delta V_i/\Delta T$). The sensitivity is maximized when the resistance of the RTD is equal to the resistance of the reference resistor. Accordingly, the nominal value for the resistance Ri of the reference resistor preferably should be selected to be approximately equal to the resistance Rh of the RTD over the expected range of temperatures in which the measurement circuit will be used.

Figure 3A:
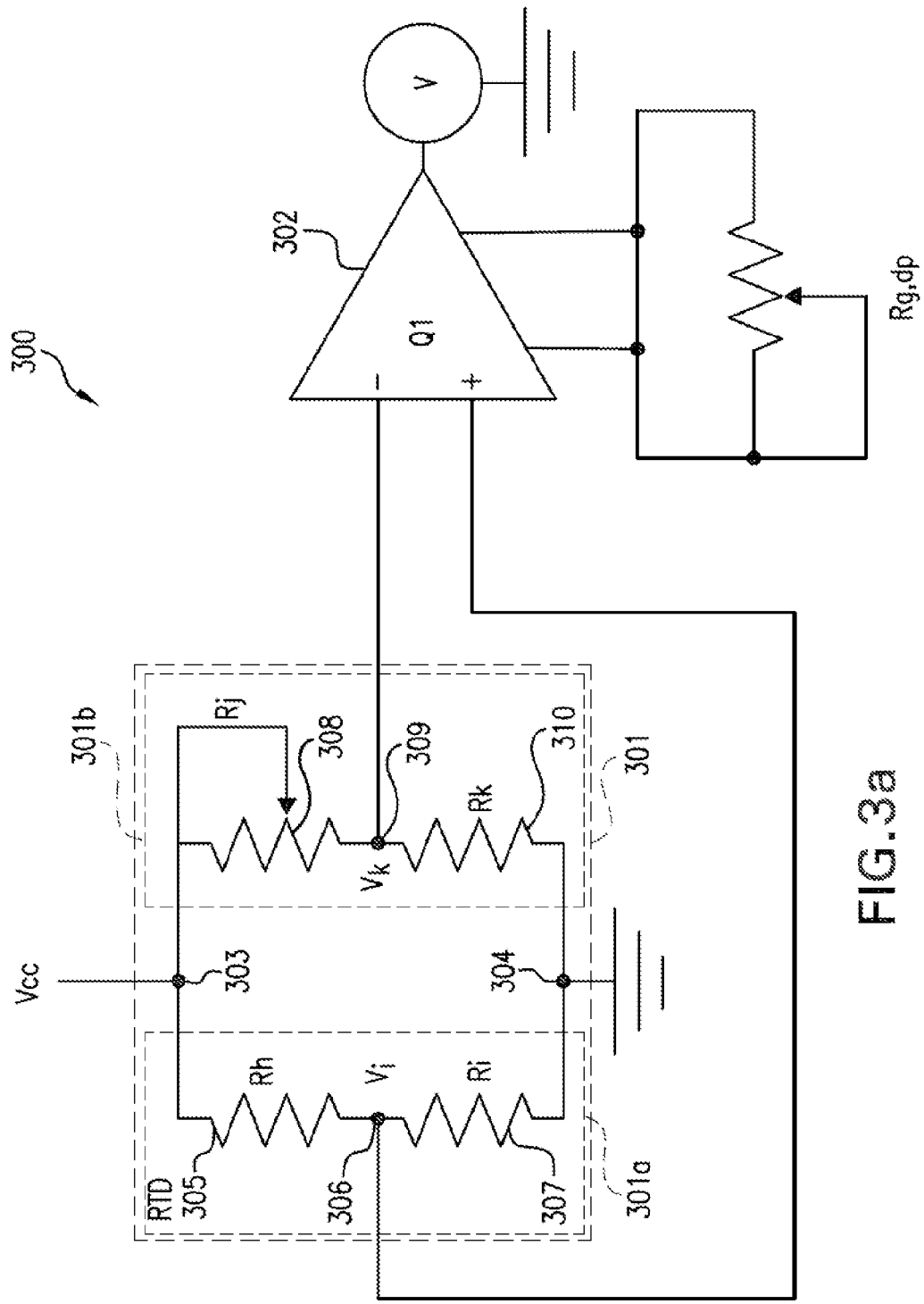
FIG. 3a is a circuit diagram illustrating an improved tunable temperature measurement circuit according to an embodiment of the invention.

To better utilize the voltage range of the measurement $V_i$ and to improve the signal to noise ratio of the temperature detection, in accordance with one embodiment the RTD may be placed within a bridge circuit. FIG. 3a illustrates a circuit diagram for a tunable temperature measurement circuit 300 in accordance with one embodiment of the present invention. As shown in FIG. 3a, the tunable temperature measurement circuit 300 may comprise a source node 303 maintained at a predetermined source voltage ($V_{cc}$), a ground node 304 maintained at a predetermined ground voltage ($V_G$), and a bridge circuit 301 coupled to a differential amplifier 302, which in some embodiments may be a programmable gain instrumentation amplifier. Differential amplifier 302 is referred to herein as a programmable gain instrumentation amplifier, but the differential amplifier in some embodiments need not be limited to a programmable gain instrumentation amplifier. In one embodiment, the bridge circuit 301 may comprise a first leg ("measurement leg") 301a including an RTD 305 having a temperature-dependent resistance Rh(T) connected between the source node 303 and a first measurement node 306 and a reference resistor 307 having a resistance Ri connected between the first measurement node 306 and the ground node 304. The bridge circuit may also comprise a second leg ("reference leg") 301b including a potentiometer 308 having an adjustable resistance Rj connected between the source node 303 and a reference node 309, and a scaling resistor 310 having a resistance Rk connected between the reference node 309 and the ground node 304. In some embodiments, potentiometer 308 is a programmable digital potentiometer.

In one exemplary embodiment, the relative resistances in the bridge circuit 301 are selected to be proportional so that:

$$Rj = C \cdot Rh(T_0) \qquad \text{Equation 6}$$

$$Rk = C \cdot Ri \qquad \text{Equation 7}$$

In the above relations, C is a scaling factor that ensures the current through the second leg is small, which in turn ensures that the potentiometer 308 and the scaling resistor 310 do not heat significantly. In one embodiment, this scaling factor may be in a range between 1 and 1000, and is preferably 100.

In temperature measurement circuit 300, the voltage difference between measurement node 306 ($V_i$) and reference node 309 ($V_k$) are compared via instrumentation amplifier 302 to output a precise signal corresponding to the temperature sensed by RTD 305.

Figure 3B:
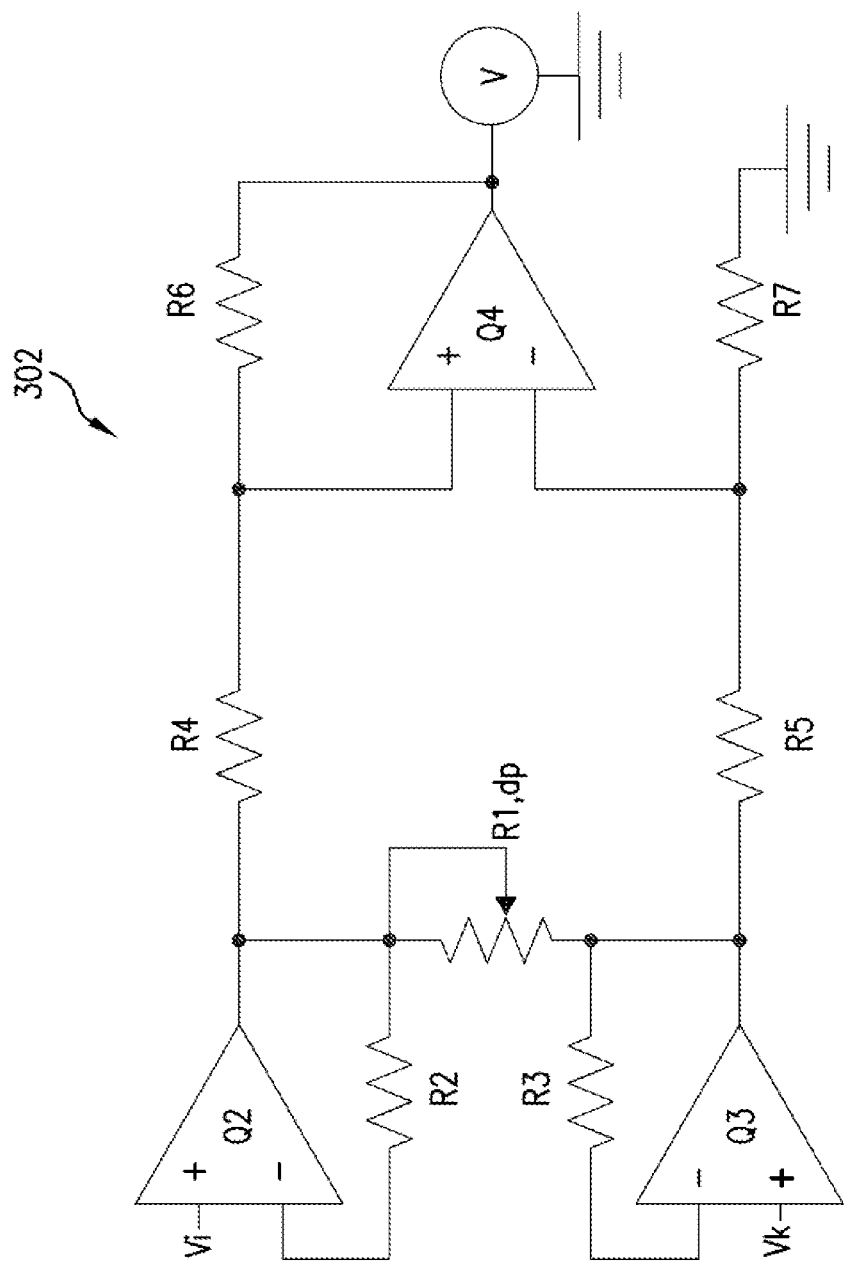
FIG. 3b is a circuit diagram illustrating a programmable gain instrumentation amplifier according to an embodiment of the invention.

FIG. 3b illustrates one embodiment of a programmable gain instrumentation amplifier 302. As shown in FIG. 3b, the relationship between the voltage out V and the difference between the input voltages $V_i$ and $V_k$ can be controlled by adjusting potentiometer R1. In some embodiments, potentiometer R1 is a programmable digital potentiometer.

In the embodiment shown in FIG. 3a, the voltage $V_i$ of the measurement node 306 is coupled to the non-inverting input of the programmable gain instrumentation amplifier 302, while the voltage $V_k$ from the reference node 309 is coupled to the inverting input of the programmable gain instrumentation amplifier 302. In alternate embodiments, the voltage $V_i$ of the measurement node 306 may be coupled to the inverting input of the programmable gain instrumentation amplifier 302, while the voltage $V_k$ from the reference node 309 is coupled to the non-inverting input of the programmable gain instrumentation amplifier 302.

Figure 3C:
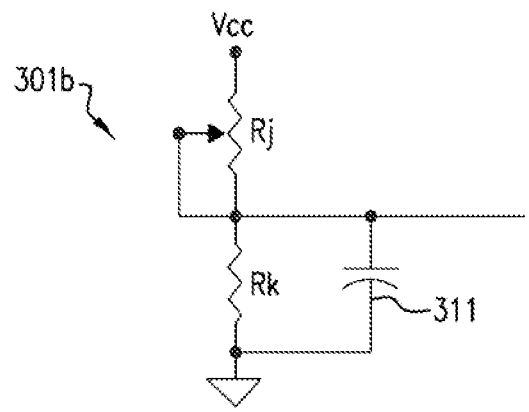
FIG. 3c is a circuit diagram illustrating a capacitor connected in parallel with the scaling resistor according to some embodiments of the invention.
Figure 3D:
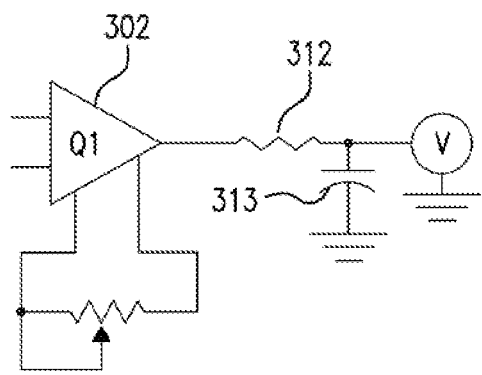
FIG. 3d is a circuit diagram illustrating a low pass filter applied to the output of the programmable gain instrumentation amplifier according to some embodiments of the invention.

Referring to FIGS. 3c and 3d, certain features contained in some embodiments of a temperature measurement circuit 300 are illustrated. As shown in FIG. 3c, the reference leg 301b of the bridge circuit 301 may also comprise a capacitor 311 connected in parallel with the scaling resistor 310. This capacitor 311 tends to make the reference side of the bridge circuit 301 more stable and less prone to high frequency noise. As shown in FIG. 3d, a low pass filter may be coupled to the output of the instrumentation amplifier 302. The filter may comprise a resistor 312 and a capacitor 313. The resistance of the resistor 312 and the capacitance of the capacitor 313 are selected to filter out high frequency noise such as, for example, variations at a rate exceeding approximately 10 kHz. In some embodiments the resistance of the resistor 312 may be in a range between 200Ω and 10,000Ω, and is preferably 820Ω. In other embodiments, the capacitance of the capacitor 313 may be in a range between 100 pF and 40,000 pF, and is preferably 500 pF.

Figure 4:
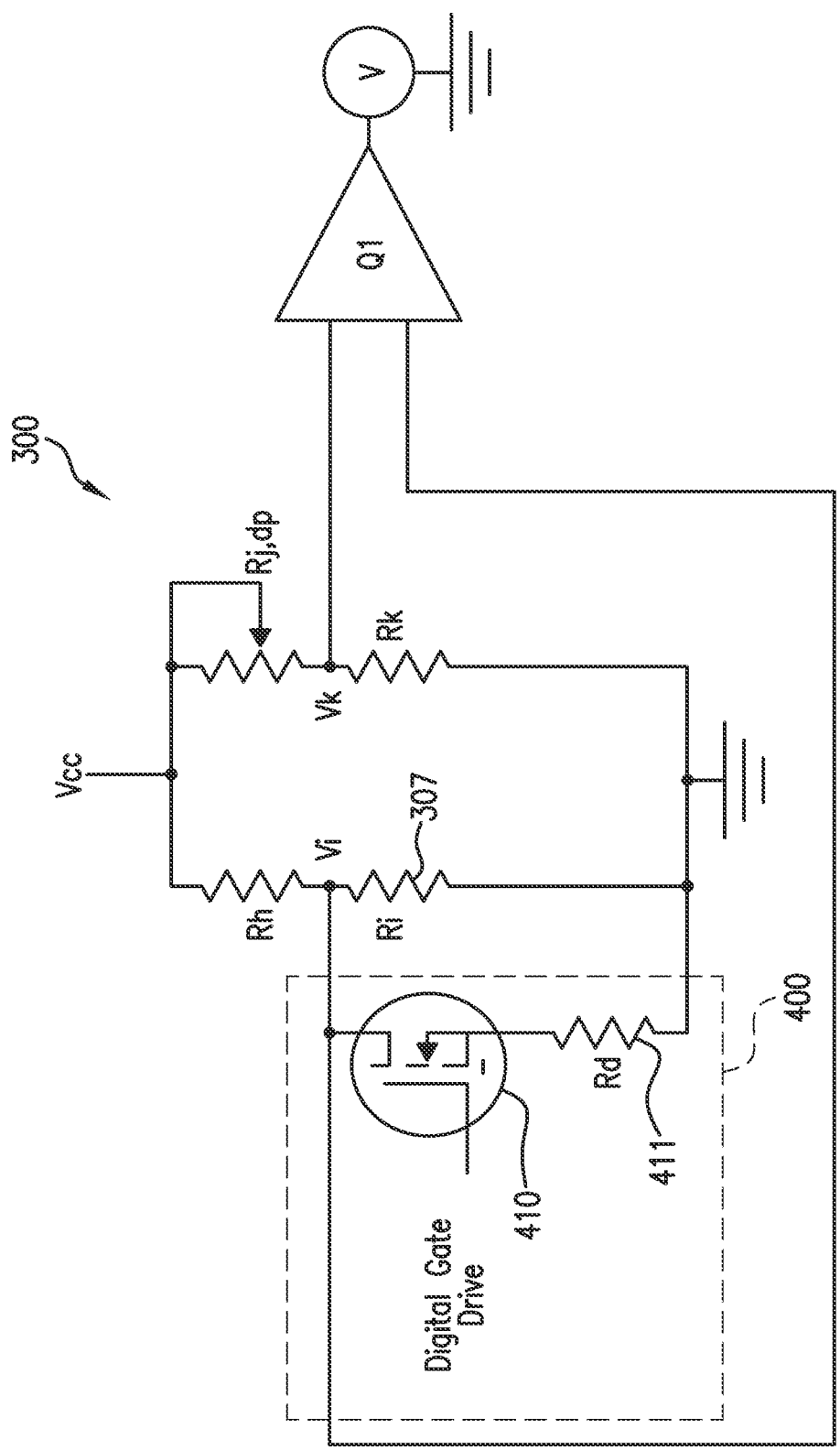
FIG. 4 is a circuit diagram illustrating a bypass circuit according to an embodiment of the invention.

FIG. 4 illustrates a tunable temperature measurement circuit 300 in accordance with other embodiments. As shown in FIG. 4, the temperature measurement circuit 300 may further comprise a bypass circuit 400 for providing greater control over the amount of current passing through the RTD 305. The bypass circuit 400 may include a switch 410, such as a digital switch, and a low resistance resistor 411 having resistance Rd. The low resistance resistor 411 is switched into the circuit to maximize the current flowing through the RTD 305. In some embodiments the resistance of the low resistance resistor 411 may be in a range between 0Ω and 1,000Ω, and is preferably 0Ω. In other embodiments, the resistance of the low resistance resistor 411 is selected to be substantially smaller than the resistance Ri of the reference resistor 307. In some embodiments, switch 410 is used in conjunction with pulse width modulation to enable greater control over the current through RTD 305.

Figure 5:
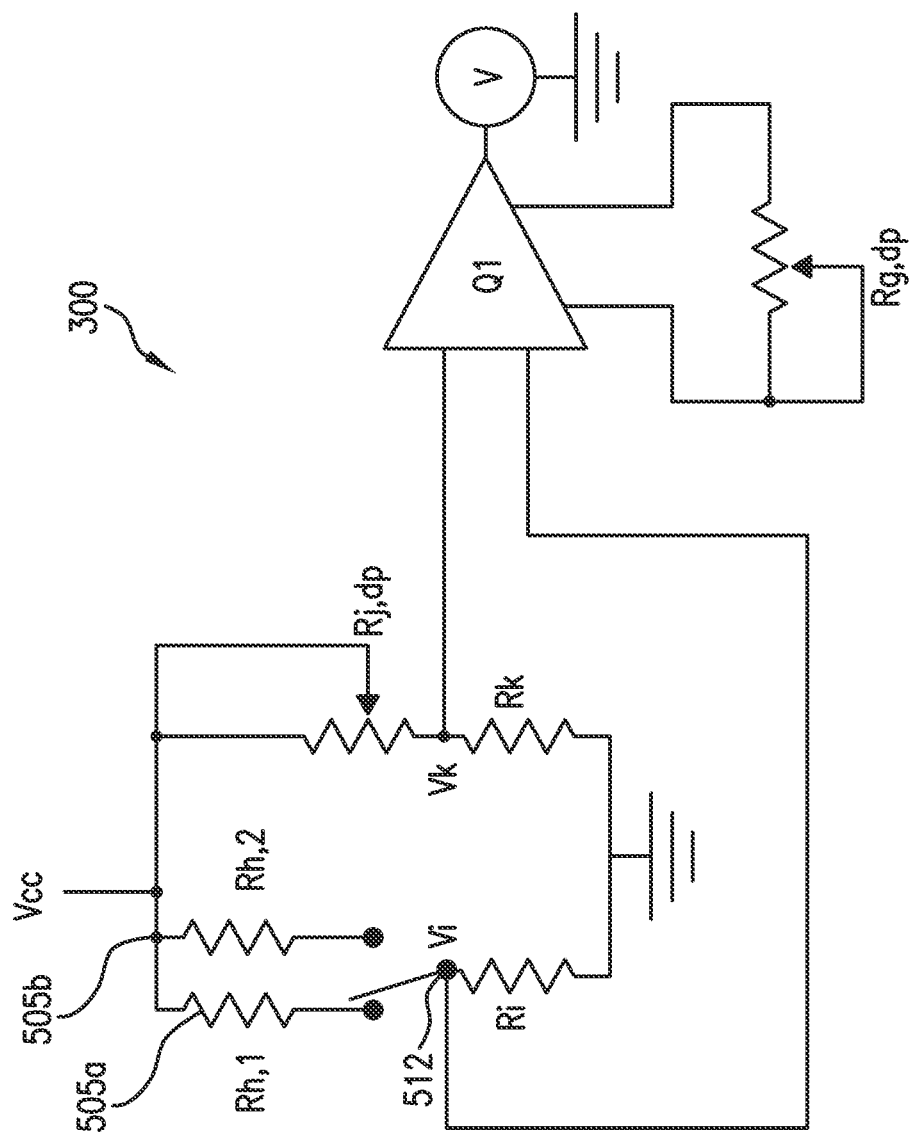
FIG. 5 is a circuit diagram illustrating a selector switch according to an embodiment of the invention.

Referring to FIG. 5, another embodiment of the tunable temperature measurement circuit 300 is illustrated. As shown in FIG. 5, the temperature measurement circuit may be configured to accommodate a plurality of RTDs (e.g. RTDs 505a and 505b) using switching circuitry. The plurality of RTDs may be configured to measure the temperatures of different environments or may be selected to possess different temperature-dependent resistances appropriate for measuring different ranges of temperatures. In some embodiments, the switching circuitry may comprise a selector switch 512. As shown in FIG. 5, the selector switch 512 can be configured to connect one of the RTDs 505a, 505b to the measurement node 306. The potentiometer 308 and programmable gain instrumentation amplifier 302 may be adjusted to accommodate each RTD as it is switched into the circuit.

Figure 6A:
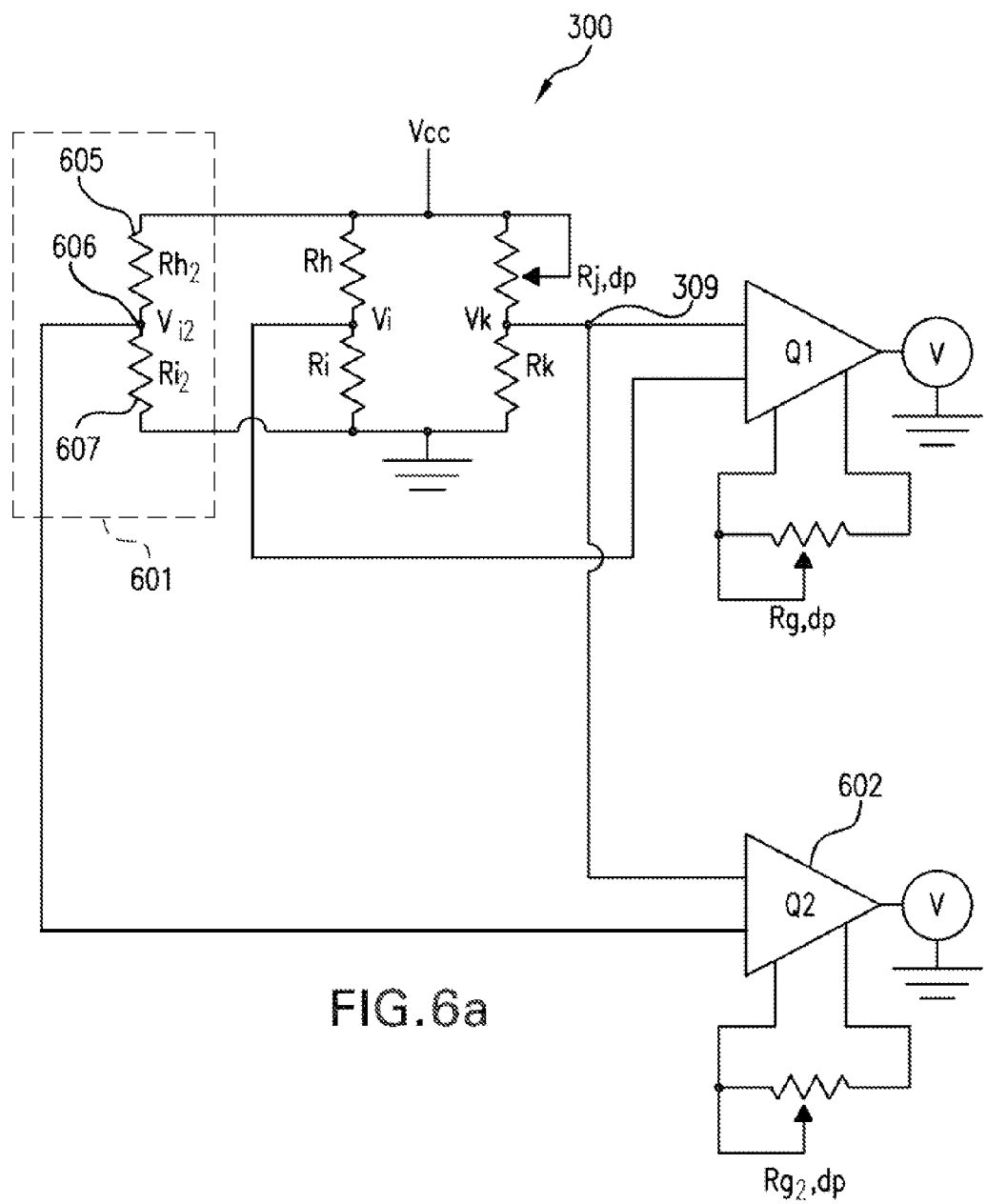
FIG. 6a is a circuit diagram illustrating an improved tunable temperature measurement circuit according to an embodiment of the invention.

FIG. 6a illustrates yet another embodiment of temperature detector circuit 300. As shown in FIG. 6a, the bridge circuit may be configured to simultaneously measure the resistance of a plurality of RTDs by providing one or more additional measurement legs 601. In some embodiments, the additional measurement leg 601 may comprise an additional RTD 605 and an additional reference resistor 607. Additionally, the embodiment shown in FIG. 6a includes an additional programmable gain instrumentation amplifier 602 coupled to a measurement node 606 of the additional measurement leg 601. In this embodiment, reference node 309 may be coupled to the plurality of the programmable gain instrumentation amplifiers 302, 602 and thus a single reference node 309 may provide a reference voltage for the plurality of RTDs 305, 605.

Figure 6B:
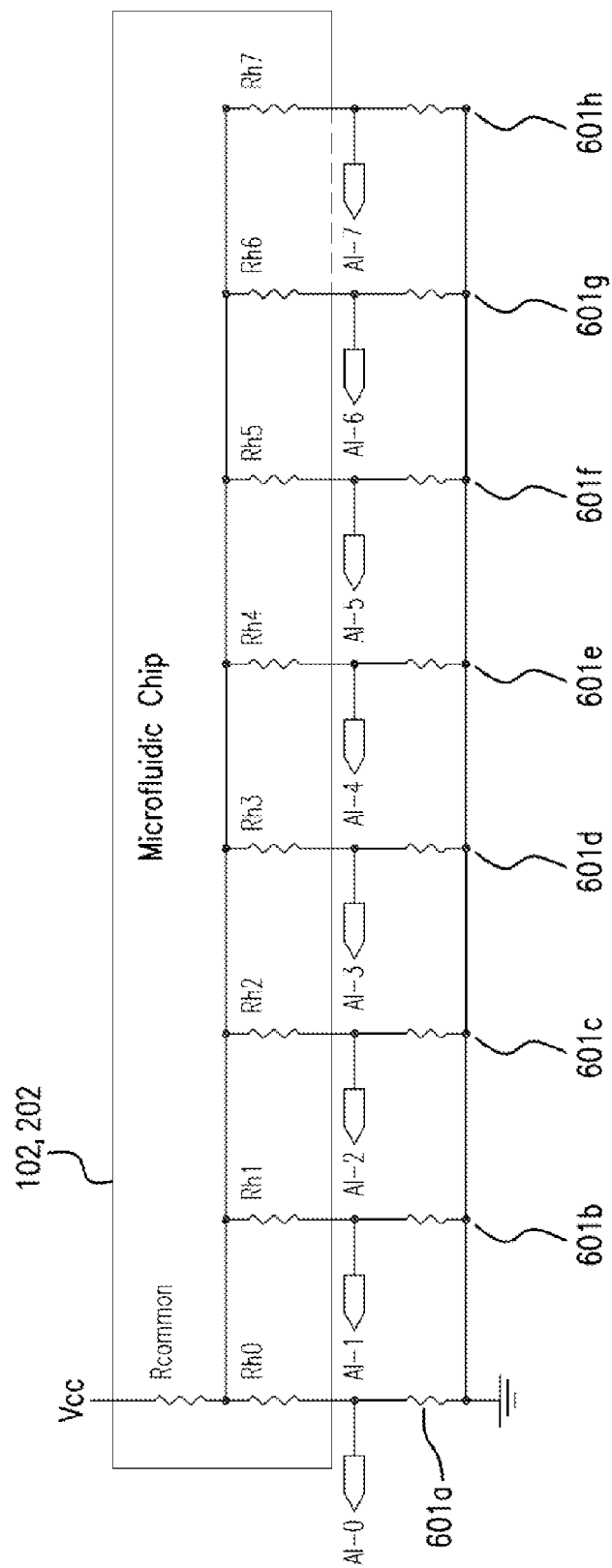
FIG. 6b is a circuit diagram illustrating a sensing portion of an improved tunable temperature measurement circuit with a plurality of measurement nodes according to an embodiment of the invention.

Referring to FIG. 6b, a relationship between a microfluidic chip 102, 202 and the measurement legs 601 of the temperature detecting circuit 300 according to one embodiment is illustrated. As shown in FIG. 6b, a plurality of measurement legs 601 (e.g. 601a through 601h) may be incorporated into a microfluidic chip 102, 202 while the remaining portion of the temperature detecting circuit is incorporated into a temperature control system, e.g. temperature control system 120. This configuration can enable a single temperature measurement circuit to be used with a plurality of distinct microfluidic chips and can also simplify the fabrication of the microfluidic chips by reducing the circuitry thereon.

Figure 6C:
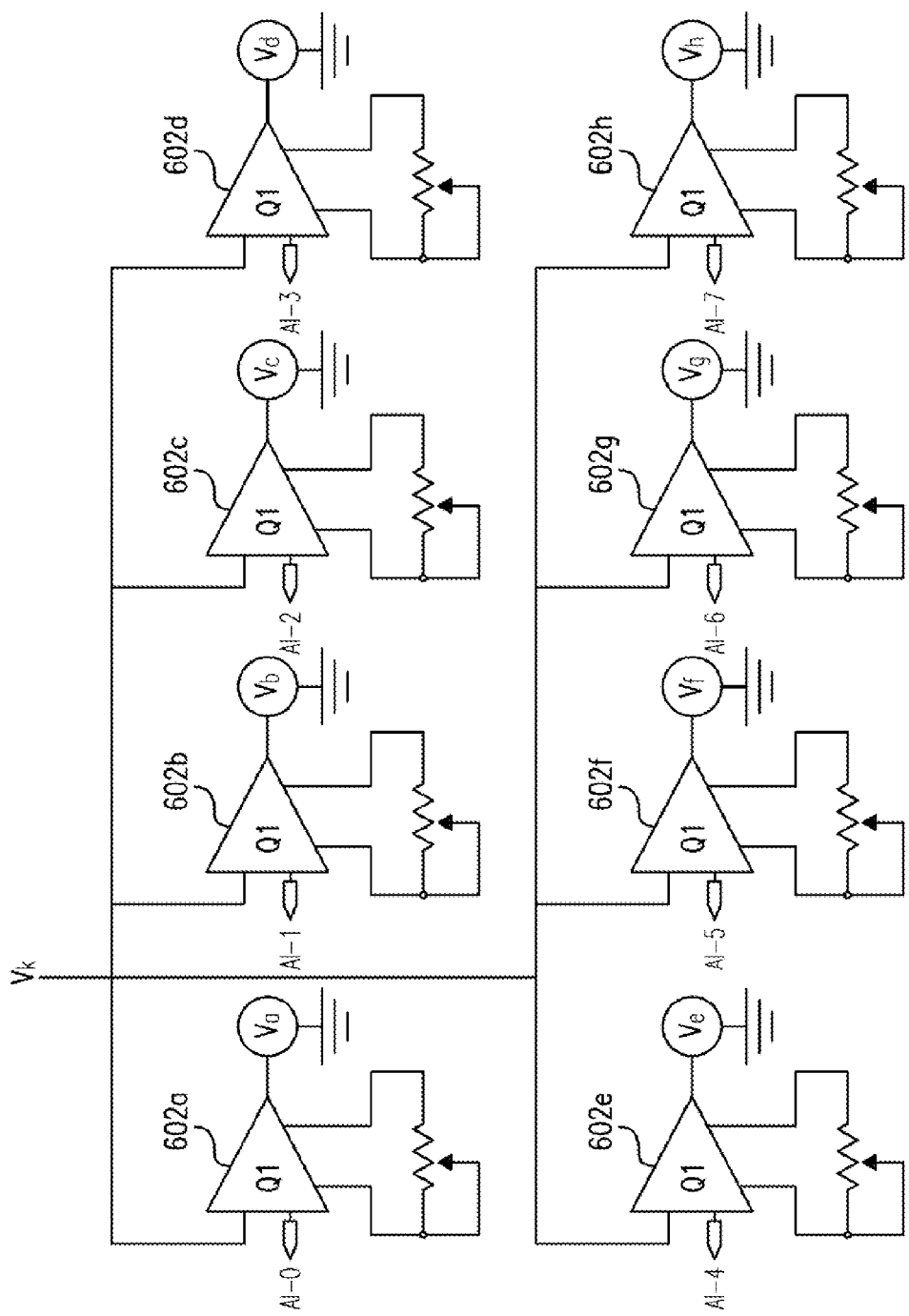
FIG. 6c is a circuit diagram illustrating an amplification and measurement portion of an improved tunable temperature measurement circuit with a plurality of measurement nodes according to an embodiment of the invention.
Figure 6D:
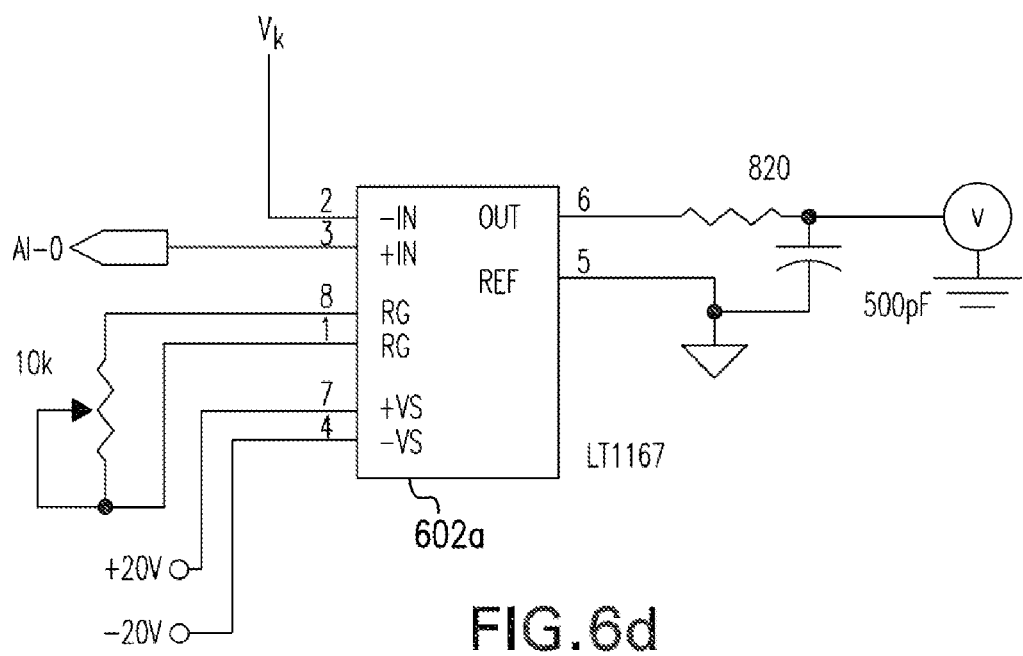
FIG. 6d is a circuit diagram illustrating a programmable gain instrumentation amplifier according to an embodiment of the invention.

FIG. 6c illustrates an exemplary embodiment of the programmable gain instrumentation amplifiers coupled to the measurement legs 601a though 601h shown in FIG. 6b. As shown in FIG. 6c, the measurement node (AI-0 through AI-7) for each measurement leg 601a-601h is connected to a separate programmable gain instrumentation amplifier 602a through 602h. Furthermore, as shown in FIG. 6c, the voltage $V_k$ of the reference node 309 is shared among all of the programmable gain instrumentation amplifiers in accordance with one embodiment. As described with reference to FIG. 6b, in some embodiments the programmable gain instrumentation amplifiers 602a through 602h and associated control circuitry may be incorporated into a temperature control system 120 rather than integrated with the microfluidic chip 102, 202. As illustrated in FIG. 6d, in some embodiments, the programmable gain instrumentation amplifiers may be implemented using, for example, Single Resistor Gain Programmable, Precision Instrumentation Amplifiers, Linear Technology part no. LT1167.

Figure 6E:
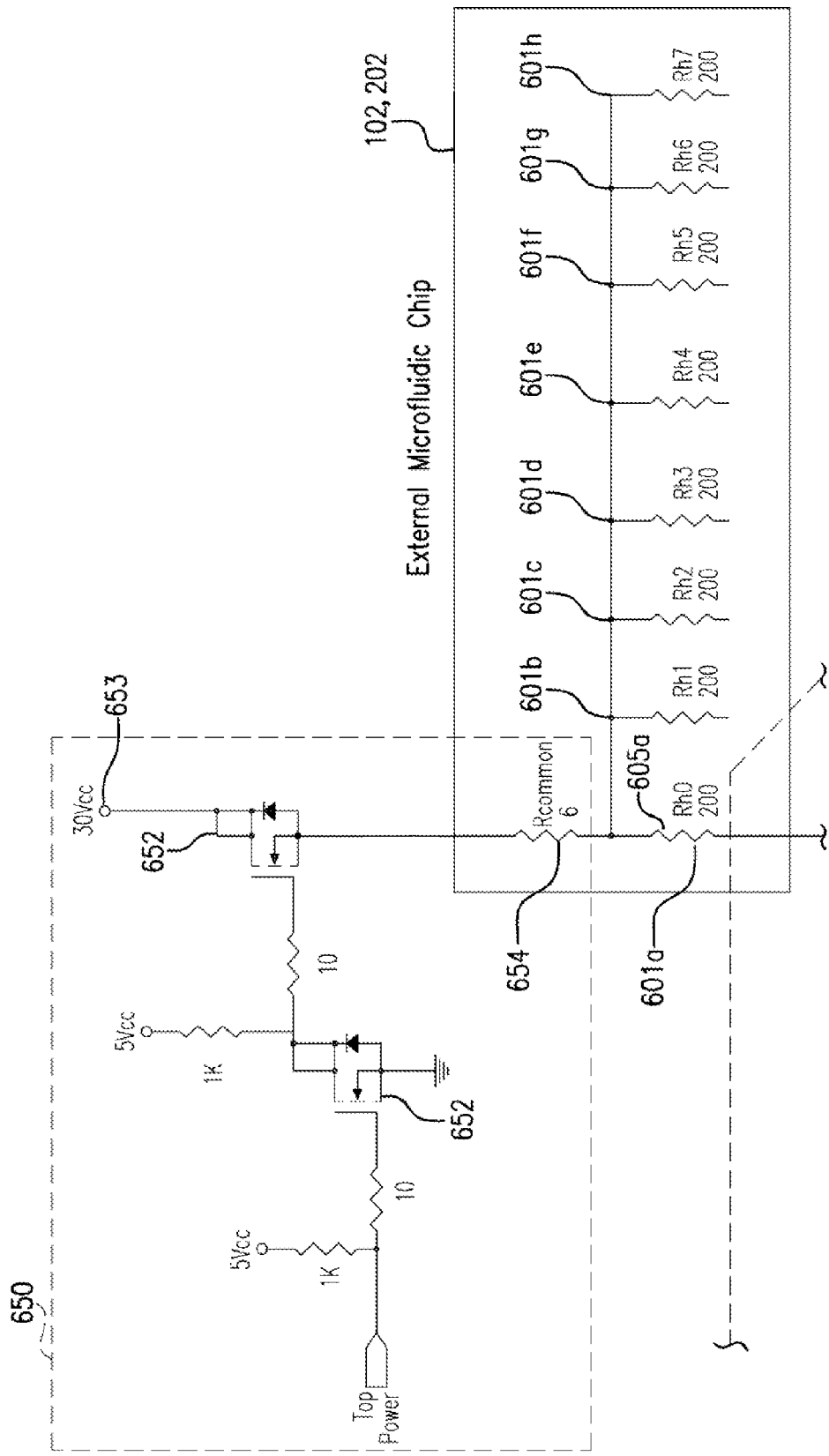
FIG. 6e is a circuit diagram illustrating a power supply circuit for a tunable temperature measurement circuit with a plurality of programmable gain instrumentation amplifiers according to an embodiment of the invention.
Figure 6F:
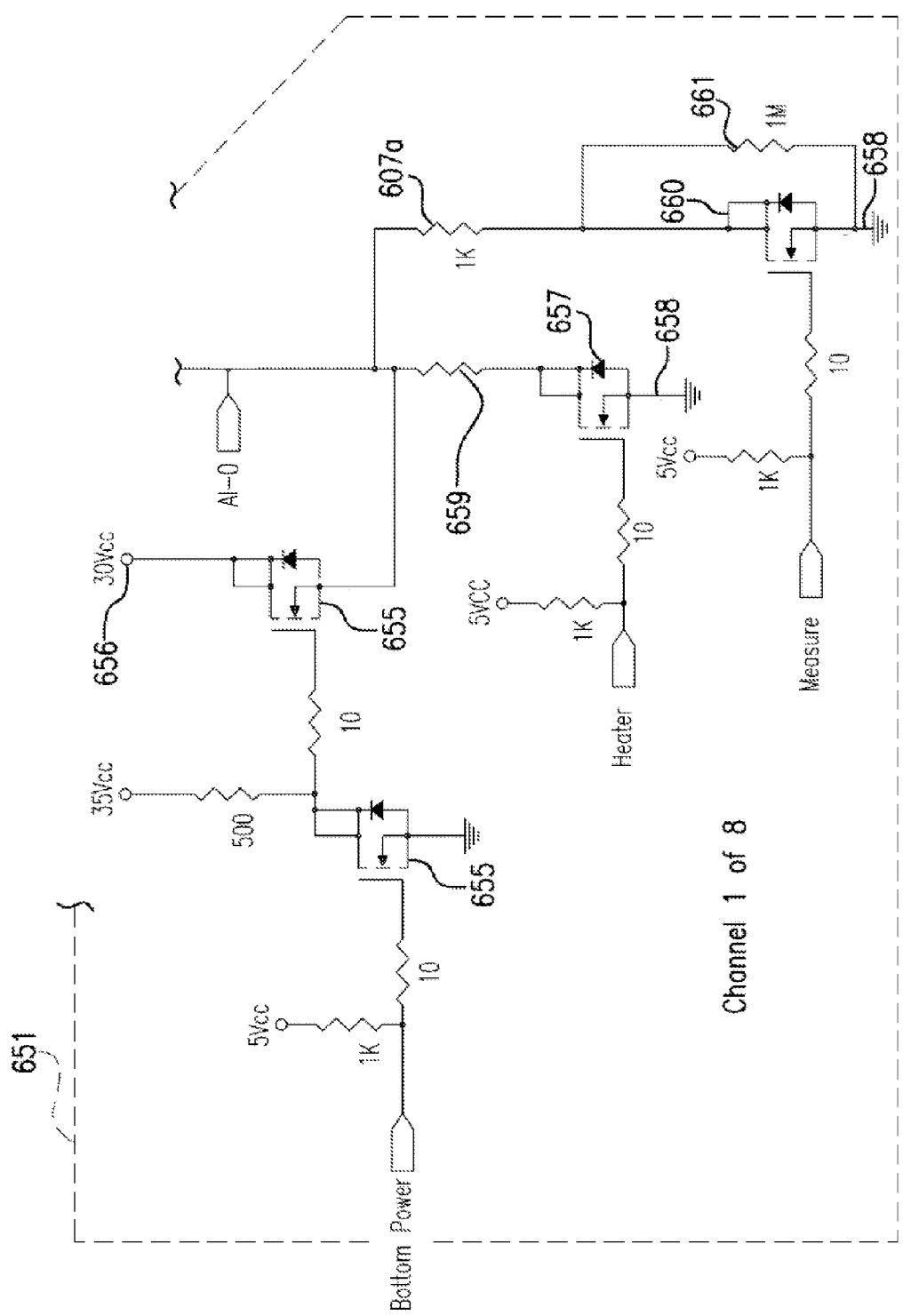
FIG. 6f is a circuit diagram illustrating control circuitry for a bypass circuit that performs multiplex measurements according to an embodiment of the invention.

Referring to FIGS. 6e and 6f, schematics of circuitry for performing a multiplex measurement technique according to some embodiments of the invention are illustrated. In one embodiment, the multiplex measurement technique involves switching a common power supply circuit 650 and a plurality of switching circuits 651 (see FIG. 6f) to operate each RTD measurement leg (e.g. 601a through 601h) independently.

FIG. 6e illustrates the common power supply circuit 650. Power supply circuit 650 may comprise electric switches 652, which can be Metal Oxide Semiconductor Field Effect Transistors (MOSFET) switches, that are driven by a digital line "Top Power." The switches 652 may be used to connect or disconnect a top power source 653 (e.g. +30V) to a common lead 654.

FIG. 6f illustrates one embodiment of the switching circuit 651 for one of the eight RTD measurement legs (e.g., the measurement leg 601a corresponding to RTD 605a). The switching circuits 651 may include electric switches 655, which can be MOSFET switches, that are driven by a digital line "Bottom Power," for connecting the corresponding RTD (e.g. RTD 605a) with a bottom power source 656 (e.g. +30V).

The switching circuits 651 may also include electric switch 657, which can be a MOSFET switch, that is driven by a digital line "Heater," for connecting the corresponding RTD (e.g. 605a) with a reference voltage 658 (e.g. 0 V) via a low resistance resistor 659 having a relatively a low resistance (e.g. 0Ω). In some embodiments, the resistance of the low resistance resistor 659 may be in a range between 0Ω and 1,000Ω, and is preferably 0Ω. The low resistance resistor 659 is switched into the circuit to maximize the current flowing through the RTD 605a and cause the RTD 605a to heat rapidly.

The switching circuits 651 may also include electric switch 660, which can be a MOSFET switch, that is driven by a digital line "Measure," for connecting the corresponding RTD (e.g. 605a) with the reference voltage 658 via a reference resistor 607a having a relatively high resistance (e.g. 1,000Ω). In some embodiments, the resistance of the low resistance resistor 659 is selected to be substantially smaller than the resistance of the reference resistor 607a.

Additionally, as illustrated in FIG. 6f, in some embodiments, the switching circuits 651 may include a shunt resistor 661 connected in parallel with the switch 660 and having a resistance value substantially higher than the reference resistor 607a (e.g. 1,000,000Ω). The shunt resistor 661 acts as a shunt around switch 660 when switch 660 is OFF. With the switch 660 ON, the resistance measurements can be taken as normal. When the switch 660 is OFF, however, then resistance measurements can still be taken due to the small current that still flows through the shunt resistor 661.

In one embodiment, each of the remaining RTD measurement legs (e.g. 601b-601h) also includes a switching circuit 651. With the circuit illustrated in FIGS. 6e and 6f, the common lead 654 can be disconnected from the top power source 653, each RTD can be selectively connected to the bottom power source 656 and reference voltage 658, and each RTD can be selectively removed from the resistive network. This embodiment thus allows for isolated, power-on and power-off measurements.

In some embodiments, the circuit illustrated in FIGS. 6e and 6f may be used to measure the series resistance across any two of the RTDs (e.g., 605a-605h). For example, the Top Power signal may be used to set the switches 652 to the OFF state and disconnect the top power source 653 from the common lead 654. Next, the Bottom Power signal corresponding to a first switching circuit 651 may be used to connect the bottom power source 656 to the corresponding first RTD (e.g., 605a). Then, the Measure signal of a second switching circuit 651 may be used to connect the reference voltage 658 to the corresponding second RTD (e.g., 605b) via the corresponding reference resistor (e.g. 607b). These settings will cause current to flow from the bottom power source 656, through the first RTD (e.g., 605a), the second RTD (e.g., 605b), and the reference resistor (e.g. 607b) in series to the reference voltage 658, and the voltage at the measurement node (e.g. AI-1) of the second switching circuit 651 will correspond to the series resistance of the first and second RTDs (e.g. 605a and 605b). By controlling the switches of each of the switching circuits 651, many other combinations of resistances can be measured. Aspects of additional circuitry for performing multiplex measurement techniques are disclosed in commonly assigned U.S. patent application Ser. No. 12/165,043, incorporated herein by reference in its entirety.

In some embodiments wherein multiple RTDs share a common reference node, the multiplex measurement technique described above can create undesirable cross-talk. In some embodiments, the RTD leads fluctuate between three different voltage levels: $V_{cc}$, $V_G$ ground, and $V_{measure}$. These three states occur when the RTD is used as the power supply side for multiplex measurement, when it is heated, and when it is used as a sensor, respectively. Using the multiplex circuit technique, only one channel will be at $V_{measure}$ at a given moment and the other channels will be at a voltage close to $V_{cc}$. However, whenever the voltage of a channel goes to $V_{cc}$ or ground, this can force the instrumentation amplifier associated with that particular sensor into saturation (also called the overload condition). Using the shared reference node configuration, this overload of one instrumentation amplifier may affect the reference voltage $V_k$, causing one sensor's overload to modify another sensor's reference voltage.

Figure 7A:
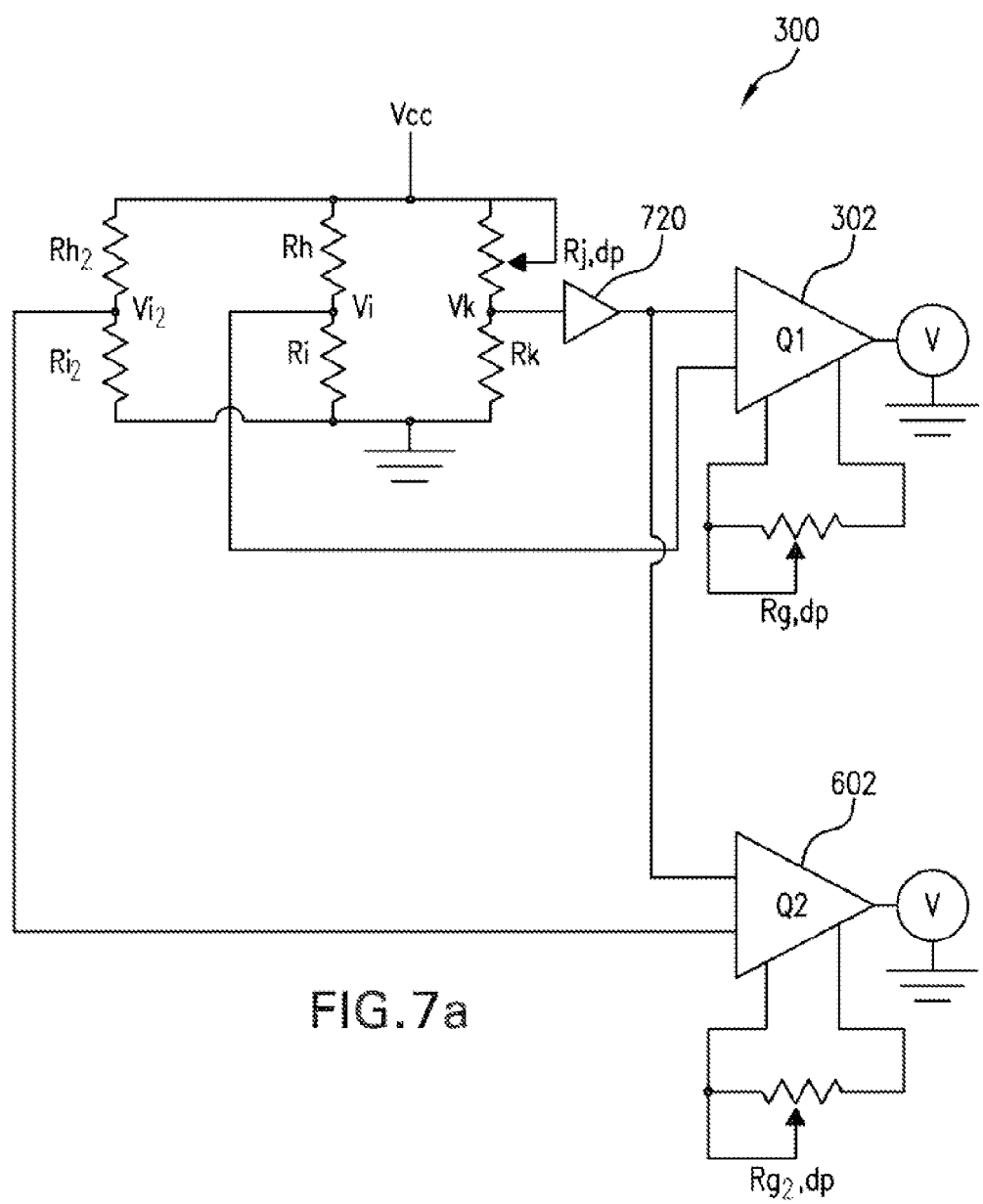
FIG. 7a is a circuit diagram illustrating an improved tunable temperature measurement circuit with a unity gain buffer according to an embodiment of the invention.

FIG. 7a illustrates an embodiment of the temperature detecting circuit 300 that addresses this cross-talk issue. As shown in FIG. 7a, a unity gain buffer 720 is placed in between the reference node 309 and the programmable gain instrumentation amplifiers 302, 602. This buffer reduces the effect of cross-talk between the sensors by preventing the overload condition of one instrumentation amplifier from affecting the reference voltage $V_k$.

Figure 7B:
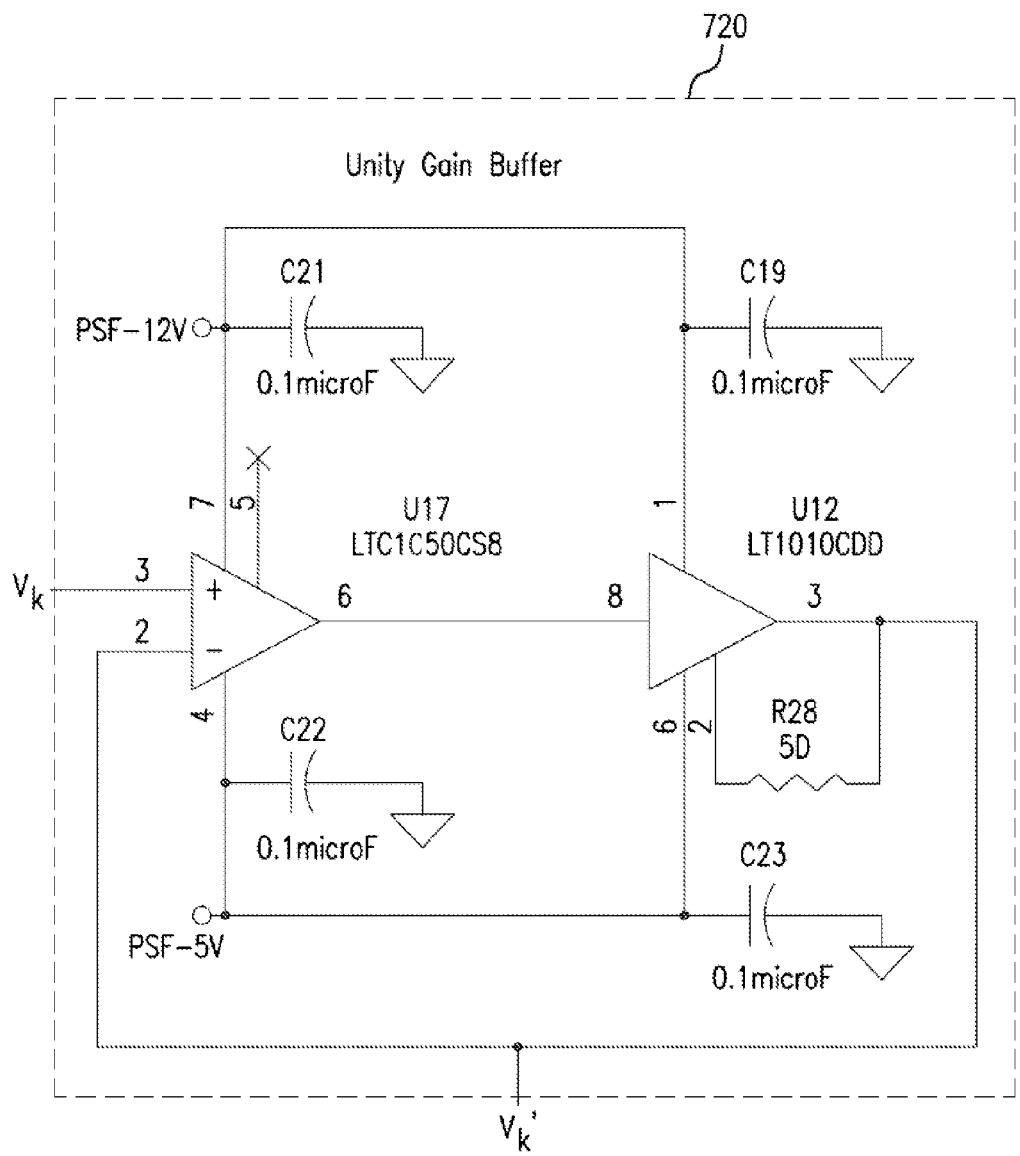
FIG. 7b is a circuit diagram illustrating a unity gain buffer according to an embodiment of the invention.

FIG. 7b illustrates a unit gain buffer 720 in accordance with one embodiment. As shown in FIG. 7b, a unity gain buffer receives input voltage $V_k$ from the reference node and outputs voltage $V_k'$ to the programmable gain instrumentation amplifiers. The low output impedance of the unit gain buffer 720 provides the current required by any saturated instrumentation amplifiers and allows the unsaturated amplifiers to work as designed without affecting the reference voltage.

Figure 8:
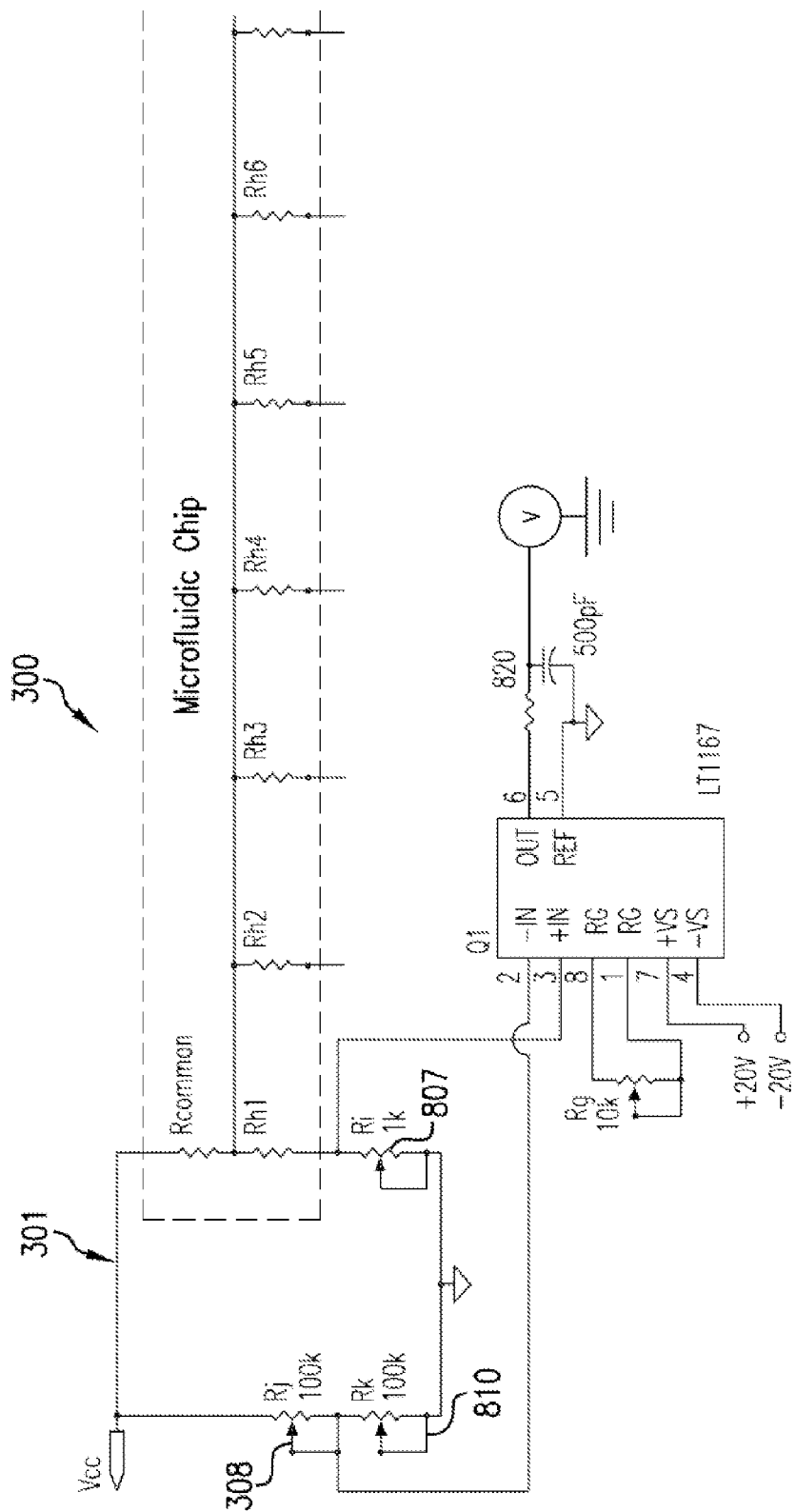
FIG. 8 is a circuit diagram illustrating an improved tunable temperature measurement circuit according to an embodiment of the invention.

Referring to FIG. 8, another embodiment of the temperature detecting circuit 300 is illustrated. As shown in FIG. 8, in this embodiment, the bridge circuit 301 is fully adjustable with programmable resistances. In addition to potentiometer 308, the reference resistor 807 and scaling resistor 810 may also comprise potentiometers. In some embodiments, the potentiometers may be programmable digital potentiometers. An advantage of this configuration is its ability to accept widely varying heater/sensor Rh resistances while optimizing the signal to noise ratio. With this configuration it is possible for a single temperature controller 120 to accept different platform chips 102, 202 that perform different biological assays. Some assays may require a different PCR protocol with additional thermocycling (e.g. small amplicon or probe melting). The added thermocycling may be achieved with a longer microchannel and correspondingly longer thin-film heater/sensor Rh. The longer heater/sensor Rh would then likely have a significantly larger resistance. By adding programmable reference resistor 807, improved sensitivity can be maintained, such as, for example, when Rh=Ri. In some embodiments, programmable resistor 810 is included to maintain a fixed bridge ratio C even while the resistance Ri of the reference resistor 807 varies.

In one exemplary embodiment, if the RTDs in platform chip "A" have resistances of 100Ω and the RTDs in platform chip "B" have resistances of 250Ω, then the programmable reference resistor 807 could be digitally adjusted to 100Ω or 250Ω as required. Of course, there is no limit to the number of different platform chips that could be used because the reference resistor 807 and the scaling resistor 810 are programmed as required. Furthermore, a single platform chip could have two or more very different RTD resistances. This may improve the functionality of the device by enabling two or more very different kinds of assays on the same chip (i.e. a hybrid chip that simultaneously runs two very different PCR protocols). In this case, the resistors 807 and 810 would simply be programmed different for each RTD.

Finally, this fully adjustable bridge configuration could be used along with the shared bridge configuration discussed above to create a highly flexible, but still efficient, measurement system.

Bridge Adjustment

In some embodiments, the temperature-dependent resistance Rh(T) of the RTD may vary due to manufacturing variations, contact irregularities, corrosion, differences in design, etc. In a bridge adjustment process the potentiometer 308 in the tunable temperature measurement circuit 300 is tuned to account for variable RTD characteristics.

Figure 9:
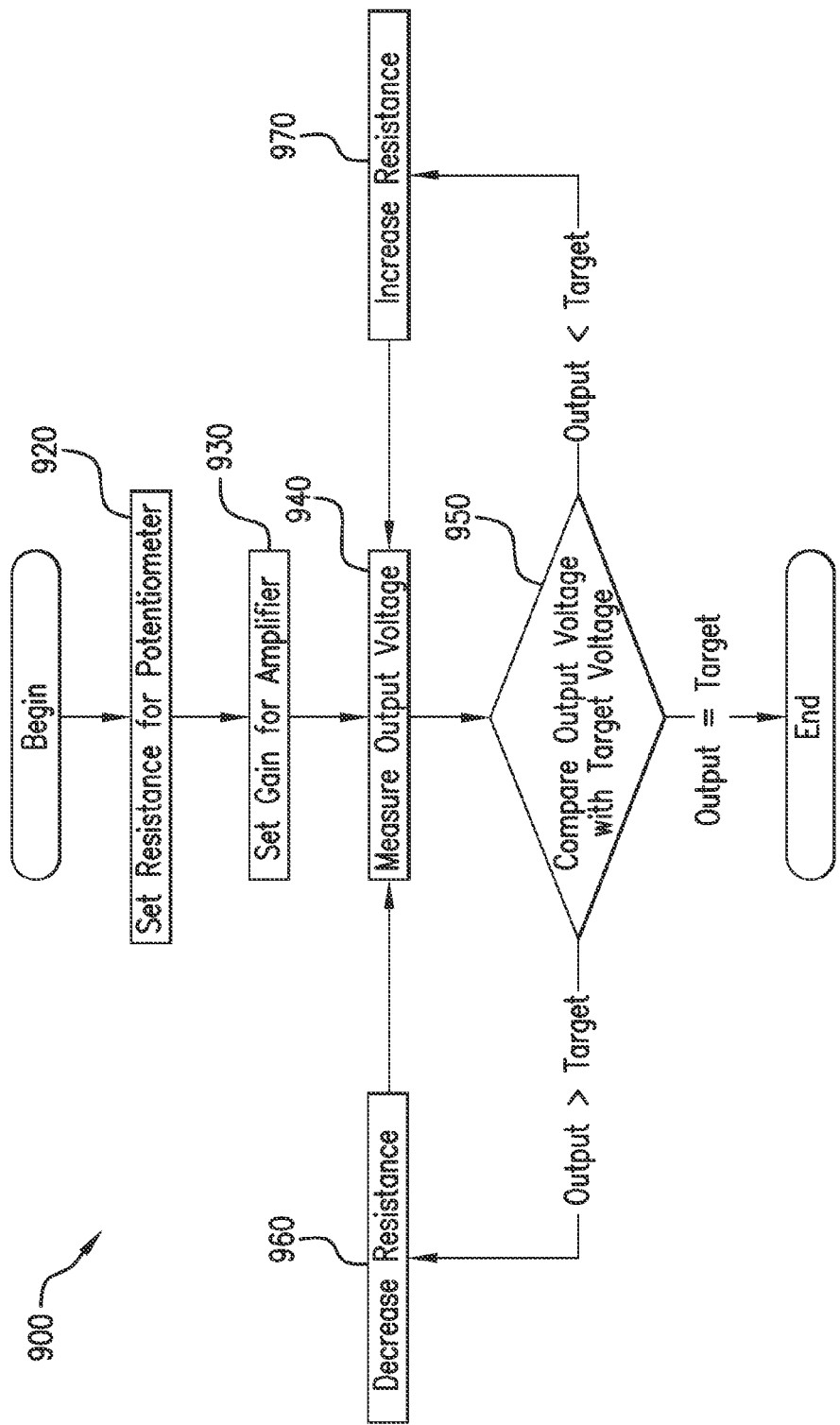
FIG. 9 is a flow chart illustrating a bridge adjustment method in accordance with embodiments of the invention.

FIG. 9 illustrates a flow chart describing a bridge adjustment process 900 for adjusting the potentiometer 308 in the temperature measurement circuit 300 in accordance with another aspect of the present invention. In some embodiments, the bridge adjustment process 900 may be performed by a bridge adjustment controller. Process 900 may begin at 920, where the bridge adjustment controller may set an initial resistance value for the potentiometer 308. At step 930, the bridge adjustment controller may set an initial gain value G for the programmable gain instrumentation amplifier 302.

After these initial values are set at steps 920 and 930, the bridge adjustment controller measures the output voltage $V_{out}$ in step 940. As discussed above, the output voltage will be indicative of the gain value G multiplied by the difference between the voltage $V_i$ of the measurement node 306 and the voltage $V_k$ of the reference node 309. For example, in embodiments where the measurement node 306 is coupled to the non-inverting input of the programmable gain instrumentation amplifier 302, and the reference node 309 is coupled to the inverting input of the programmable gain instrumentation amplifier 302, the output voltage $V_{out}$ may follow the relation shown in Equation 8:

$$V_{out}=G \cdot (V_i-V_k) \qquad \text{Equation 8}$$

At step 950, the bridge adjustment controller compares the output voltage $V_{out}$ against a predetermined target voltage.

In the case that the output voltage $V_{out}$ is above the target voltage, at step 960 the bridge adjustment controller adjusts the resistance of the potentiometer in a first direction. For example, in embodiments where the measurement node 306 is coupled to the non-inverting input of the programmable gain instrumentation amplifier 302, and the reference node 309 is coupled to the inverting input of the programmable gain instrumentation amplifier 302, a voltage $V_{out}$ above the target voltage may indicate that the voltage $V_k$ at the reference node 309 is too low and the bridge adjustment controller decreases the resistance of the potentiometer 308 in order to increase the voltage $V_k$ at the reference node 309.

In the case that the output voltage $V_{out}$ is below the target voltage, at step 970 the bridge adjustment controller adjusts the resistance of the potentiometer in a second direction. For example, in embodiments where the measurement node 306 is coupled to the non-inverting input of the programmable gain instrumentation amplifier 302, and the reference node 309 is coupled to the inverting input of the programmable gain instrumentation amplifier 302, a voltage $V_{out}$ below the target voltage may indicate that the voltage $V_k$ at the reference node 309 is too high and the bridge adjustment controller increases the resistance of the potentiometer 308 in order to decrease the voltage $V_k$ at the reference node 309.

In the case that the output voltage $V_{out}$ is about equal to the target voltage (that is, the voltage difference between the reference node 309 and the measurement node 306 is within a predetermined margin), then the bridge adjustment controller may terminate the bridge adjustment process 900.

In some preferred embodiments, the predetermined target voltage is selected to utilize more of the range of the programmable gain instrumentation amplifier 302 and improve the signal to noise ratio. For example, a target output voltage of zero (0) volts may be selected to maximize the signal with respect to the common mode voltage (i.e. to maximize $\Delta V_{out}/V_i$). Common target output voltage ranges include 0 to +10 V, −5 to +5 V, and −10 to +10 V. In some preferred embodiments, the target output voltage is at the lowest voltage at the lowest temperature and the highest voltage at the highest temperature (or vice versa).

In some embodiments, the RTD 305 may be integrated with a platform chip (e.g. the microfluidic device 202), while the potentiometer 308 may be integrated into a temperature control system (e.g. the temperature control system 120). In this embodiment, many distinct microfluidic devices or other temperature-controlled devices may be used with the same control system 120. Each microfluidic device 202 may be marked with a machine readable identification, e.g., a machine readable bar code or a radio-frequency identification ("RFID") tag. The temperature control system may read the machine readable identification and store the calibrated potentiometer setting for each device in association with the identification for that device. The temperature control system may also be configured to detect the machine readable identification of a device and program the potentiometer for that device based upon the previously stored settings.

Self-Heating Calibration

According to another aspect of the present invention, a self-heating calibration process is used to account for undesirable self-heating effects of the RTD.

Using the RTD 305 as a temperature sensor requires passing an electrical current I through it. According to Joule's first law, an electrical current I passing through a resistor having resistance Rh(T) will dissipate an amount of power P as heat:

$$P=I^2 \cdot Rh(T) \qquad \text{Equation 9}$$

The heating from P will cause the RTD to rise in temperature by an amount $\Delta T$ above the actual environmental temperature. This increase in temperature above the environmental temperature is known as self-heating and can cause undesirable errors in measurement values. The specific magnitude of the temperature increase will depend upon the rate at which heat is being produced and the thermal resistance $\theta$ between RTD 305 and the environment:

$$\Delta T = \theta \cdot P \qquad \text{Equation 10}$$

Thus, the RTD 305 itself will be at a temperature $\Delta T$ higher than the environment. In general, $\Delta T$ is independent of the ambient temperature. For example, if $\Delta T$ is 5° C. and the environment is 20° C., then the temperature of RTD 305 will be 25° C. In an otherwise comparable environment (that is, in an environment where $\theta$ has not changed significantly) at 100° C., the temperature of the RTD 305 will be 105° C.

The undesirable effects of self-heating can be minimized by limiting the current through the RTD 305. This can be accomplished by increasing the resistance Ri of the reference resistor 307 or by reducing the supply voltage $V_{cc}$. However, during operation, both of these changes could have undesirable consequences. As noted above, it is desirable in certain embodiments to match the resistance Ri of the reference resistor 307 to the resistance Rh of the RTD 305 in order to increase the sensitivity of the system. While increasing the resistance Ri of the reference resistor 307 would reduce the size of the self-heating effect $\Delta T$, it would also reduce the sensitivity of the measurement leg of the bridge circuit 301. Furthermore, a high supply voltage $V_{cc}$ is often desired for a good common mode signal as well as for the ability to rapidly heat the RTD.

Accordingly, it may be preferable to calibrate temperature measurement systems by calculating the self-heating voltage change $\Delta V_{sh}$ that will occur on the output voltage $V_{out}$ under normal conditions (e.g., the desired resistance Ri of the reference resistor 307, the desired gain setting G for the programmable gain instrumentation amplifier 302, and the desired supply voltage $V_{cc}$) and simply remove this known error from measurements.

According to some embodiments, the self-heating calibration process may comprise identifying voltage settings at which self-heating is minimized; measuring the resistance Rh of the RTD when self-heating is minimized; and comparing that value with the resistance Rh of the RTD under voltage settings in which self-heating is present. As described above and with reference to Equation 1, in the absence of self-heating an RTD may behave as an ohmic device (i.e., exhibit a linear I-V curve) if the ambient temperature T is held constant. Accordingly, in some embodiments the voltage settings at which self-heating is minimized can be indirectly determined by identifying the voltage settings at which the resistance Rh of the RTD remains relatively constant with respect to changes in voltage, that is, the voltage settings as which $\Delta Rh/\Delta V_{cc} \approx 0$. As explained below, in some embodiments these voltage settings can also be identified as settings at which $\Delta V_{out}/(G \cdot \Delta V_{cc})$ remains constant.

The voltage difference between the measurement node 306 and the reference node 309 ($V_i-V_k$) is proportional to the voltage difference between the source voltage and the ground voltage ($V_{cc}-V_G$), as illustrated in Equation 11:

$$(V_i - V_k) = (V_{cc} - V_G) \cdot \left( \frac{Ri}{Rh+Ri} - \frac{Rk}{Rj+Rk} \right) \quad \text{Equation 11}$$

Setting the gain of the programmable gain instrumentation amplifier 302 to a value G causes the output voltage $V_{out}$ to be proportional to the voltage difference between the measurement node 306 and the reference node 309 ($V_i-V_k$), as illustrated in Equation 12:

$$V_{out} = G \cdot (V_i - V_k) \quad \text{Equation 12}$$

Substituting the expression in Equation 11 for ($V_i-V_k$) into Equation 12 produces a relation between Vout and ($V_{cc}-V_G$), as shown below in Equations 13 and 14:

$$V_{out} = G \cdot (V_{cc} - V_G) \cdot \left( \frac{Ri}{Rh+Ri} - \frac{Rk}{Rj+Rk} \right) \quad \text{Equation 13}$$

$$\rho \equiv \frac{V_{out}}{G \cdot (V_{cc} - V_G)} = \left( \frac{Ri}{Rh+Ri} - \frac{Rk}{Rj+Rk} \right) \quad \text{Equation 14}$$

When the ambient temperature is held constant and the effects of self-heating are minimized (such that Rh does not change), resistance values in the bridge circuit will not change and the ratio ρ of the output voltage $V_{out}$ to the gain G multiplied by the source-ground voltage difference ($V_{cc}-V_G$) will be relatively constant. As shown in Equation 15, when ρ remains constant $\Delta V_{out}/(G \cdot \Delta V_{cc})$ is also constant:

$$\frac{\partial V_{out}}{\partial V_{cc}} = G \cdot \rho \quad \text{Equation 15}$$

Figure 10A:
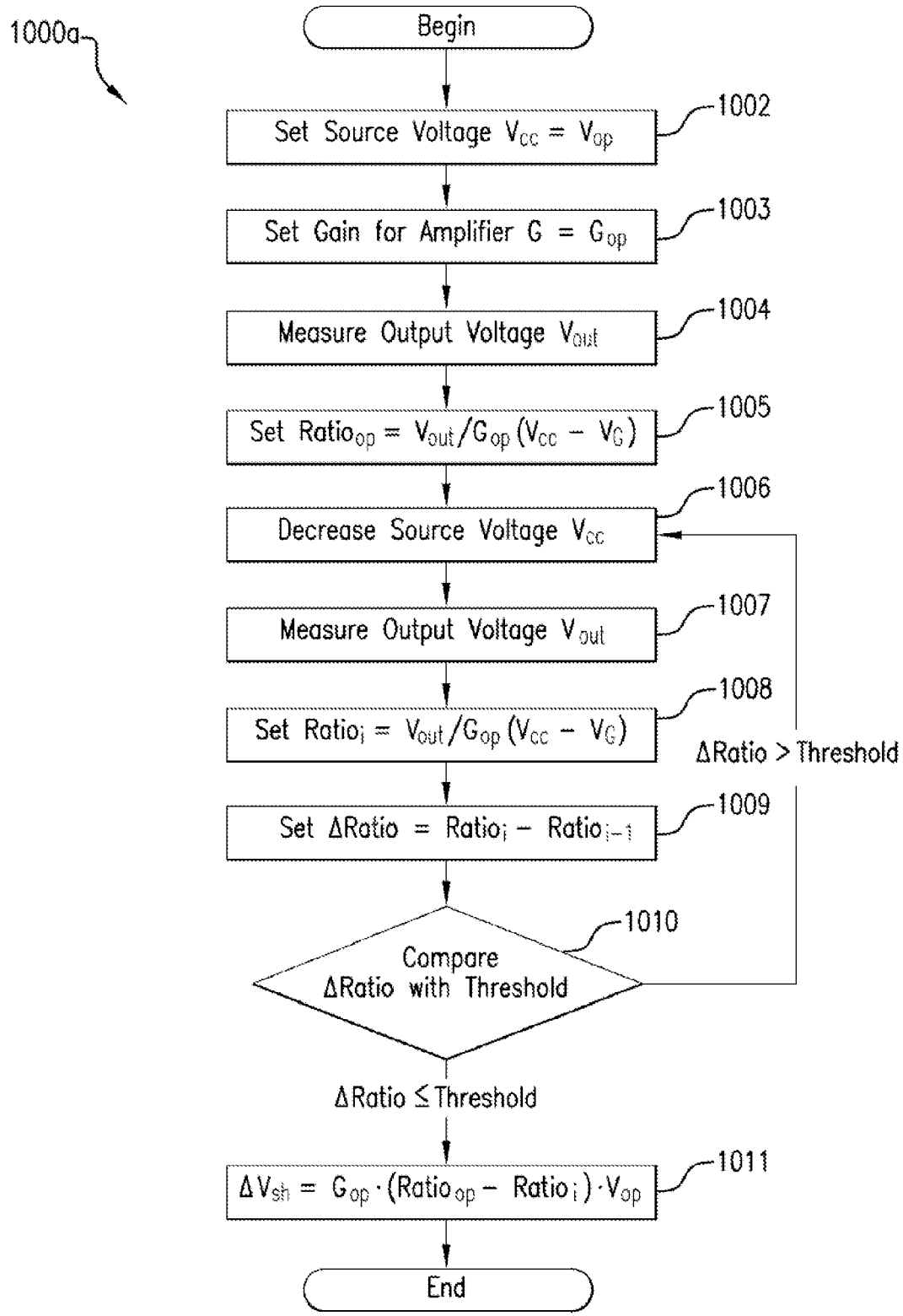
FIG. 10a is a flow chart illustrating a self-heating calibration method in accordance with embodiments of the present invention.

FIG. 10a illustrates a flow chart describing a self-heating calibration process 1000a in accordance with another aspect of the present invention for identifying the voltage settings at which $\Delta V_{out}/(G \cdot \Delta V_{cc})$ is constant, and wherein this information is utilized to calibrate the temperature measurement circuit against self-heating. In some embodiments, the self-heating calibration process 1000a may be performed by a self-heating calibration controller. In one embodiment, this process involves setting the supply voltage $V_{cc}$ at a desired voltage level $V_{op}$ causing an unknown amount of self-heating and an unknown temperature change $\Delta T_{op}$. The supply voltage $V_{cc}$ is then gradually lowered, which reduces the effect of self-heating. Because the temperature change ΔT is proportional to the square of the current, the effects of self-heating will rapidly diminish as the voltage $V_{cc}$ is reduced. At a sufficiently low supply voltage $V_L$, the effects of self-heating will be negligible. As described above, the low supply voltage $V_L$ at which self-heating effects are no longer observed can be identified as the point at which the ratio ρ of the output voltage $V_{out}$ to the gain G multiplied by the supply-source voltage difference ($V_{cc}-V_G$) remains relatively constant despite changes to the supply voltage $V_{cc}$. At this point, a comparison between the ratio $\rho_{op}$ at the desired voltage level $V_{op}$ with the ratio $\rho_L$ at the low voltage level $V_L$ may be used to determine the effect $\Delta V_{sh}$ of self-heating at the desired source voltage level using the relation shown in Equation 16:

$$\Delta V_{sh} = G \cdot (\rho_{op} - \rho_L) \cdot (V_{op} - V_G) \quad \text{Equation 16}$$

As shown in FIG. 10a, the self-heating calibration process 1000a may begin at step 1002, where the self-heating calibration controller sets the source voltage $V_{cc}$ to be equal to a desired operational voltage $V_{op}$ such as, for example, the voltage that will be desired to provide a good common mode signal and the ability to rapidly heat the RTD.

At step 1003, the self-heating calibration controller sets the gain G for the programmable gain instrumentation amplifier 302 to a desired operational gain value $G_{op}$ such as, for example, the gain value that will maximize the signal-to-noise ratio of the temperature measurement circuit 300.

After these initial values are set, at step 1004, the self-heating calibration controller measures the output voltage $V_{out}$ of the temperature measurement circuit 300.

At step 1005, the self-heating calibration controller calculates a ratio $Ratio_{op}$ between the measured output voltage $V_{out}$ and the operational supply-ground voltage ($V_{cc}-V_G$) multiplied by the operational gain $G_{op}$.

After the initial ratio $Ratio_{op}$ is calculated, at step 1006, the self-heating calibration controller decreases the source voltage $V_{cc}$. After the source voltage $V_{cc}$ has been decreased, the self-heating calibration controller measures the new output voltage $V_{out}$ at step 1007 and calculates a new ratio $Ratio_i$ at step 1008.

At step 1009, the self-heating calibration controller determines the difference between the newly calculated ratio $Ratio_i$ and the previously calculated ratio $Ratio_{i-1}$. In the case that the difference between these ratios is above a predetermined threshold, that is, decreasing the source voltage $V_{cc}$ continues to have a substantial effect on the ratio, the self-heating calibration controller will return to step 1006 and lower the source voltage $V_{cc}$ again. In the case that the difference between these ratios is below the threshold (that is, decreasing the source voltage $V_{cc}$ no longer has a substantial effect on the ratio), then the self-heating calibration controller has identified $V_L$ and will proceed to step 1011.

At step 1011, the self-heating calibration controller calculates the self-heating voltage difference $\Delta V_{sh}$ by subtracting the ratio $Ratio_i$ calculated at the low voltage $V_L$ from the ratio $Ratio_{op}$ calculated at the operational voltage $V_{op}$ and multiplying the difference by the gain of the programmable gain instrumentation amplifier 302 and the desired operational source-ground voltage, in accordance with Equation 16.

Figure 11:
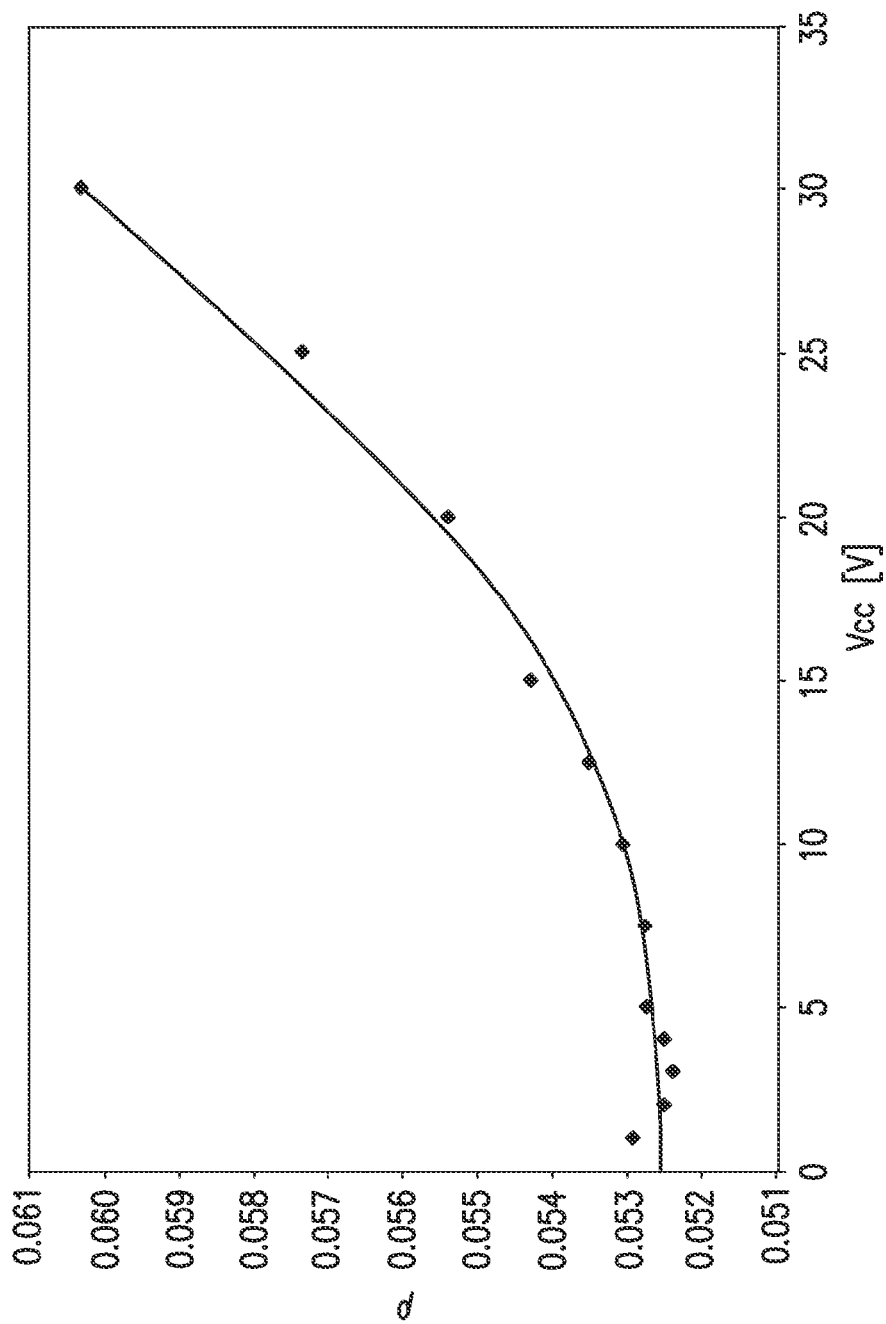
FIG. 11 is a graph illustrating the ratio $V_{out}/G(V_{cc})$ for varying values of $V_{cc}$ in a tunable temperature measurement circuit in accordance with an embodiment of the present invention.

Referring to FIG. 11, a graph of the ratio ρ vs. the source voltage $V_{cc}$ for an exemplary embodiment of the invention is illustrated. As can be seen in FIG. 11, at relatively high source voltages (e.g. $V_{cc}$=30 v), the slope of the graph is relatively higher, that is, ρ is not constant. At relatively low source voltages (e.g. $V_{cc}$=10 v), the slope of the graph is substantially lower. At source voltages below 10 volts, the value of the ratio ρ approaches a horizontal asymptote, that is, ρ remains relatively constant. To calculate $\Delta V_{sh}$, the value of ρ at the asymptote is subtracted from the value of ρ at the desired operational configuration.

Figure 10B:
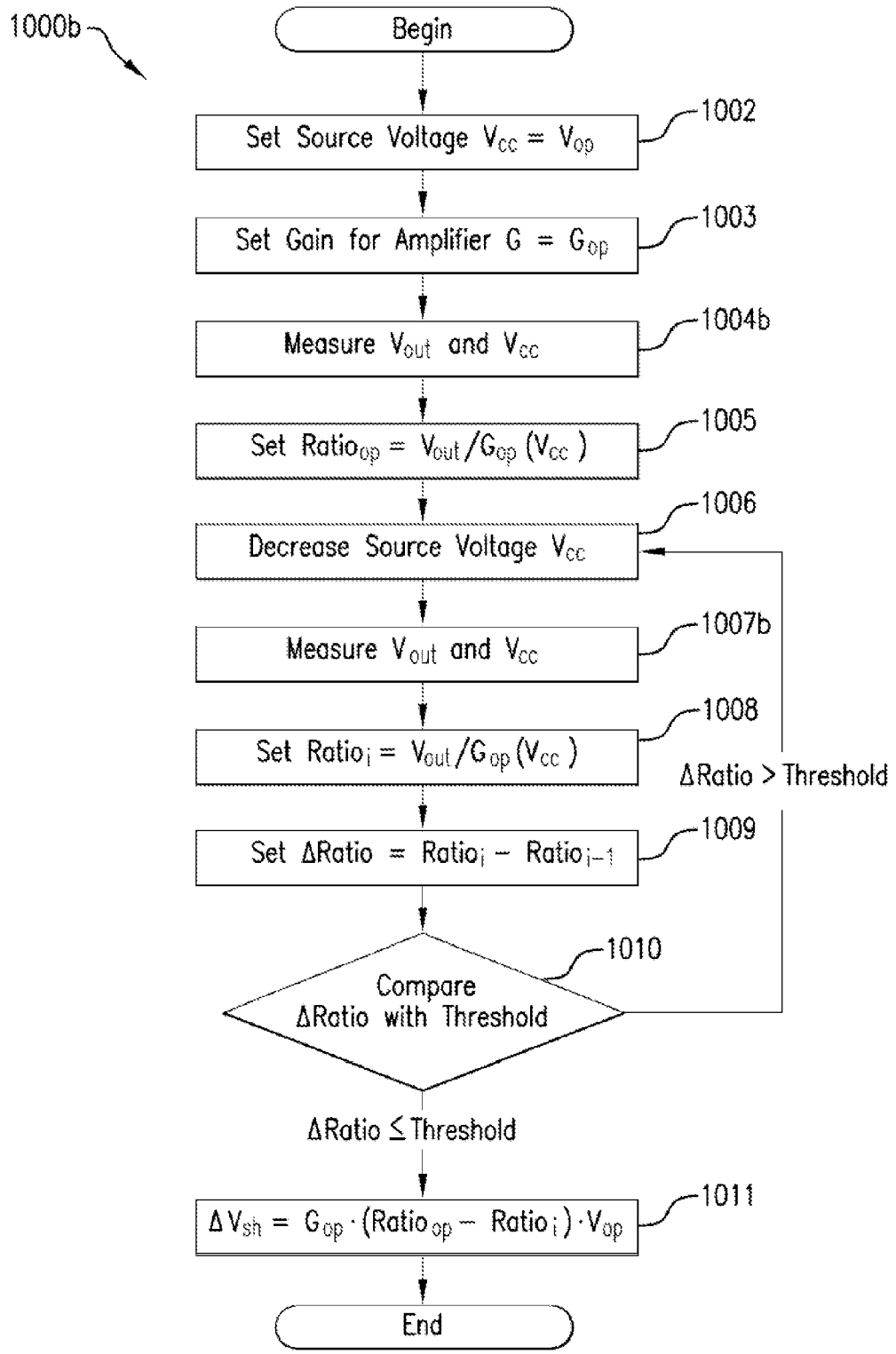
FIG. 10b is a flow chart illustrating a self-heating calibration method in accordance with embodiments of the present invention.

FIG. 10b illustrates a flow chart describing a self-heating calibration process 1000b in accordance with another embodiment of the present invention. As illustrated in FIG. 10b, the self-heating process 1000b is similar to self-heating process 1000a. In this embodiment, at steps 1004b and 1007b, the self-heating calibration controller measures the source voltage $V_{cc}$ using the same voltage measurement system as that used to measure $V_{out}$. This provides a real time measurement of the supply voltage $V_{cc}$ that can be used for the normalization self-heating calibration process and may provide a more accurate value for $V_{cc}$ than simply relying on an input voltage setting.

Figure 10C:
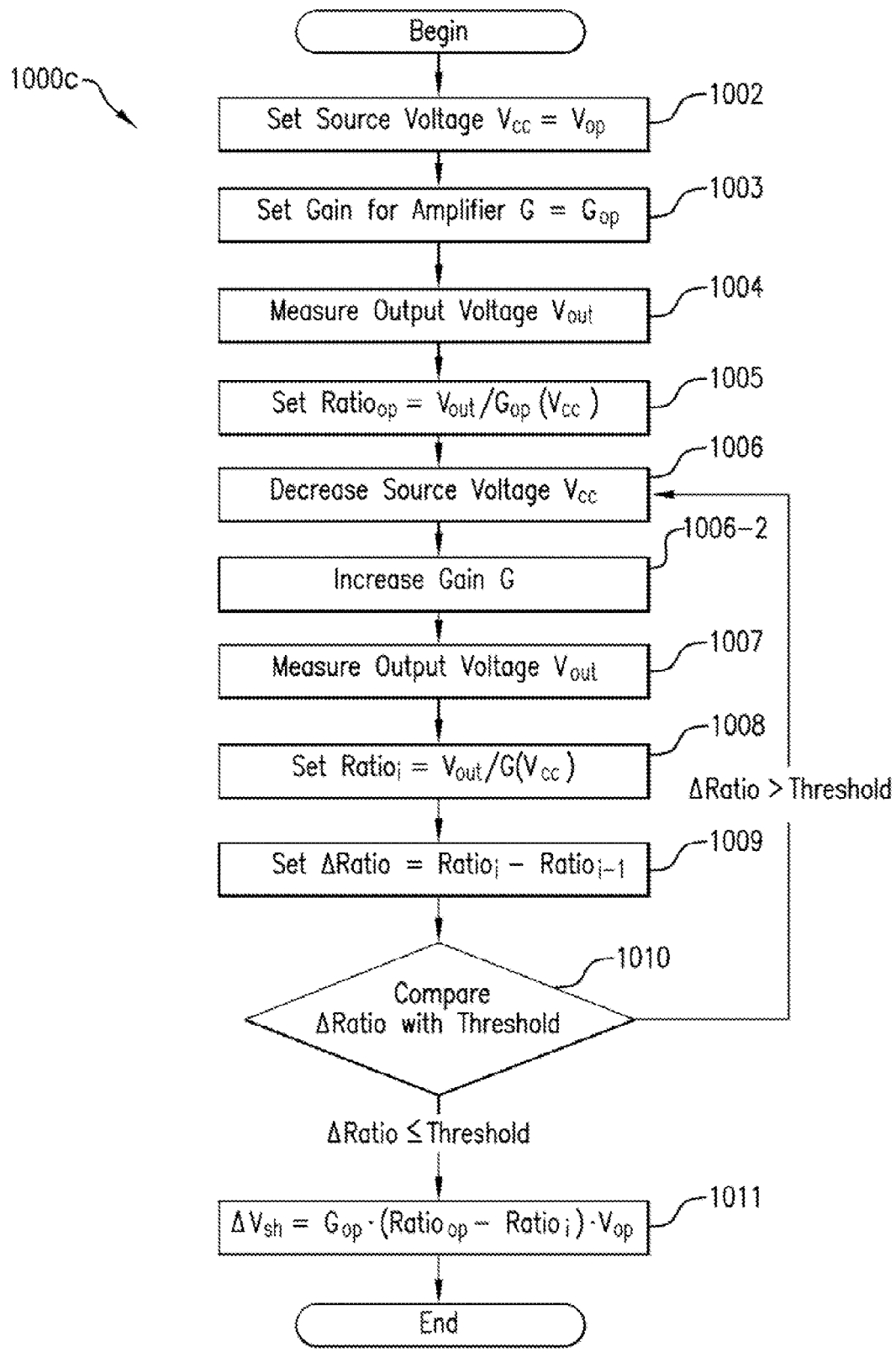
FIG. 10c is a flow chart illustrating a self-heating calibration method in accordance with embodiments of the present invention.

Referring to FIG. 10c, a flow chart describing a self-heating calibration process 1000c in accordance with another embodiment is illustrated. As illustrated in FIG. 10c, the self-heating process 1000c is similar to self-heating process 1000a. In this embodiment, at step 1006b-2, the self-heating calibration controller increases the gain G of the programmable gain instrumentation amplifier 302. This increase, combined with the decrease of the source-ground voltage ($V_{cc}$-$V_G$), may be used to ensure a sufficient range of output voltages $V_{out}$ even when the source-ground voltage ($V_{cc}$-$V_G$) is small. In some embodiments, the gain G and the source voltage $V_{cc}$ may be varied according to an inverse relationship such that the product of the source-ground voltage ($V_{cc}$-$V_G$) and the gain G remains constant. For example, suppose the gain G is initially 10 and the source-ground voltage ($V_{cc}$-$V_G$) is 30 v. A decrease in the source voltage $V_{cc}$ of 5 volts (so the source-ground voltage is now 25 volts) should be accompanied by an increase in the gain G from 10 to 12.

Thermal Calibration

With the chip 102, 202 loaded and the gross adjustments made to account for changes in heater resistance and changes in factors associated with chip loading, a fine thermal calibration may be desirable. Because PCR efficacy and diagnosis based on thermal melt depend heavily on the accuracy of the temperature measurement, thermal calibration may be required immediately before a diagnostic cycle begins. By measuring the voltage response versus temperature or the implied resistance versus temperature relationship (where resistance may, for example, be determined based on Equation 4 above) the system can define a precise calibration for the RTD immediately before a microfluidic chip 102, 202 is used.

Figure 12:
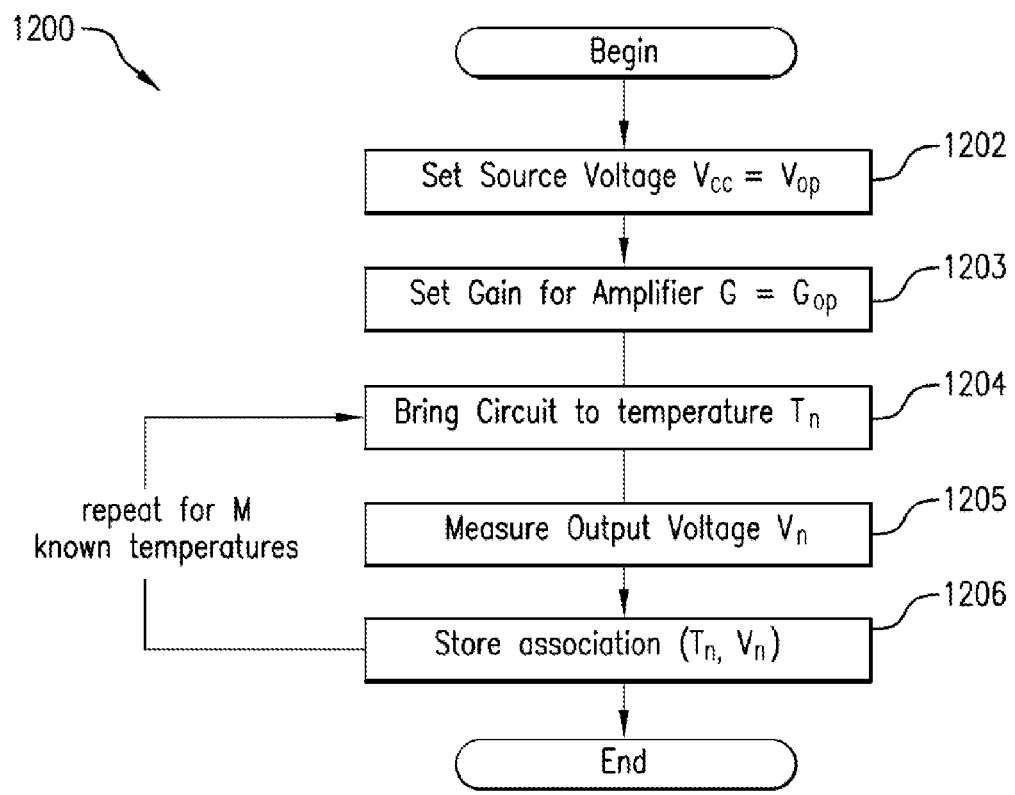
FIG. 12 is a flow chart depicting a thermal calibration method in accordance with embodiments of the present invention.

FIG. 12 illustrates a flow chart describing a thermal calibration process 1200 in accordance with another aspect of this invention. In some embodiments, the thermal calibration process 1200 may be performed by a thermal calibration controller. As shown in FIG. 12, process 1200 may begin at step 1202, where the thermal calibration controller may set the source voltage $V_{cc}$ to the desired operational voltage $V_{op}$.

At step 1203, the thermal calibration controller may set the gain value G for the programmable gain instrumentation amplifier 302 to a desired operational gain voltage $G_{op}$. The values of $V_{op}$ and $G_{op}$ may be selected, for example, to match the values that will be used when the microfluidic device 202 is performing PCR or high-resolution melt.

After the initial values have been set, the thermal calibration controller brings the temperature detecting circuit 300 to a predetermined temperature $T_n$ at step 1204. In some embodiments, this is achieved by utilizing an externally controlled heating device (e.g. a Peltier device, a resistive heater, etc.).

At step 1205, the thermal calibration controller measures the output voltage $V_n$. At step 1206, the thermal calibration controller stores the values of the temperature $T_n$ and the output voltage $V_n$ are stored in association with each other.

Then, the thermal calibration controller 1200 returns to step 1204 wherein the temperature detecting circuit 300 is brought to a new temperature T. This is repeated until the thermal calibration controller measures and stores a predetermined number M of ($T_n$, $V_n$) relationships.

With the stored set of ($T_n$, $V_n$), the temperature control system 120 can determine precise values for temperature detection. The interpolation may take the form of a curve with one or more constants for each resistive sensor on the platform chip (such as a 3 term quadratic calibration curves), or calibration may take the form of a look-up table with set voltages (or resistances) for each temperature.

In some embodiments, the externally controlled heating device is able to generate a uniform temperature environment for the platform chip and is able to precisely measure temperature. The external temperature measurement may be made by any suitable device including an RTD, a thermocouple, a thermistor, a semiconductor junction device, etc. The external temperature measurement device should be factory or third party calibrated and its calibration data should be embedded in control software, which may be configured to include this calibration data as part of thermal calibration process 1200.

Embodiments of the present invention have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method comprising:
providing a source node maintained at a predetermined source voltage;
providing a ground node maintained at a predetermined ground voltage;
providing a bridge circuit comprising:
 a first resistance temperature detector connected between the source and a first measurement node,
 a first reference resistor connected between the first measurement node and the ground node,
 a potentiometer connected between the source node and a reference node, and
 a scaling resistor connected between the reference node and the ground node; and
providing a first programmable gain instrumentation amplifier wherein a first input to the first programmable gain instrumentation amplifier is connected to the reference node, a second input to the first programmable gain instrumentation amplifier is connected to the first measurement node, and the voltage output of the first programmable gain instrumentation amplifier is representative of the temperature sensed by the first resistance temperature detector,
modulating a current passing through the first resistance temperature detector by using a bypass circuit connected between the first measurement node and the ground node, controlling the voltage output of the first programmable gain instrumentation amplifier indicative of a temperature of the first resistance temperature detector by:
 (a) setting the resistance value of the potentiometer to a first resistance value;
 (b) setting the gain of the first programmable gain instrumentation amplifier to a first gain value;
 (c) measuring the voltage output from the first programmable gain instrumentation amplifier;
 (d) in the case that the measured voltage output is above a predetermined target value, adjusting the resistance value of the potentiometer in a first direction;

(e) in the case that the measured voltage is below the predetermined target value, adjusting the resistance value of the potentiometer in a direction opposite to the first direction; and (f) repeating steps (c) through (e) until the measured voltage output from the first programmable gain instrumentation amplifier is equal to the predetermined target value.

2. The method of claim 1, wherein the predetermined target value is selected to maximize the signal to noise ratio in the output of the first programmable gain instrumentation amplifier.

3. The method of claim 1, further comprising the steps of:

(g) after performing step (f), storing the resistance value of the potentiometer in an electronic memory;

(h) associating the stored resistance value with an identifier corresponding to the first resistance temperature detector;

(i) repeating steps (a) through (h) for a plurality of resistance temperature detectors to create a plurality of associations between resistance temperature detectors and resistance values;

(j) detecting the presence of one of the plurality of resistance temperature detectors; and (k) setting the resistance value of the potentiometer to the resistance value associated with the one of the plurality of resistance temperature detectors.

4. The method of claim 3, wherein the step of detecting the presence of one of the plurality of resistance temperature detectors comprises reading a machine readable bar code from a platform chip containing the one of the plurality of resistance temperature detectors.

5. The method of claim 3, wherein the step of detecting the presence of one of the plurality of resistance temperature detectors comprises reading an RFID tag from a platform chip containing the one of the plurality of resistance temperature detectors.

6. A method comprising:

providing a source node maintained at a predetermined source voltage;

providing a ground node maintained at a predetermined ground voltage;

providing a bridge circuit comprising:
  a first resistance temperature detector connected between the source node and a first measurement node,
  a first reference resistor connected between the first measurement node and the ground node,
  a potentiometer connected between the source node and a reference node, and
  a scaling resistor connected between the reference node and the ground node; and providing a first programmable gain instrumentation amplifier wherein a first input to the first programmable gain instrumentation amplifier is connected to the reference node, a second input to the first programmable gain instrumentation amplifier is connected to the first measurement node, and the output of the first programmable gain instrumentation amplifier is representative of the temperature sensed by the first resistance temperature detector, determining an operational self-heating voltage difference by:

(a) setting the predetermined source voltage to a first source voltage value corresponding to a desired operational supply voltage;

(b) setting the gain of the first programmable gain instrumentation amplifier to a first gain value corresponding to a desired operational gain value;

(c) measuring the voltage output from the first programmable gain instrumentation amplifier;

(d) determining a first ratio of the output from the first programmable gain instrumentation amplifier to the source node voltage multiplied by the gain of the first programmable gain instrumentation amplifier;

(e) decreasing the predetermined source voltage to a new source voltage value;

(f) measuring the voltage output from the first programmable gain instrumentation amplifier;

(g) determining a new ratio of the output from the first programmable gain instrumentation amplifier to the measured source node voltage multiplied by the gain of the first programmable gain instrumentation amplifier;

(h) determining an asymptote ratio by repeating steps (e) through (g) until the change of the new ratio determined at (g) between subsequent iterations is beneath a predetermined threshold; and (i) determining the operational self-heating voltage difference by multiplying the desired operational gain value by the source voltage and the difference between the first ratio and the asymptote ratio.

7. The method of claim 6, wherein:

step (c) further comprises measuring the voltage at the source node;

step (f) further comprises measuring the voltage at the source node; and steps (d), (g), and (i) use the measured voltage at the source node as the source node voltage.

8. The method of claim 6, wherein step (e) further comprises increasing the gain of the first programmable gain instrumentation amplifier to a new gain value such that the product of the first source voltage value and the first gain value is equal to the product of the new source voltage value and the new gain value.

9. A method comprising:

providing a source node maintained at a predetermined source voltage;

providing a ground node maintained at a predetermined ground voltage;

providing a bridge circuit comprising:
  a first resistance temperature detector connected between the source node and a first measurement node,
  a first reference resistor connected between the first measurement node and the ground node,
  a potentiometer connected between the source node and a reference node, and
  a scaling resistor connected between the reference node and the ground node; and providing a first programmable gain instrumentation amplifier wherein a first input to the first programmable gain instrumentation amplifier is connected to the reference node, a second input to the first programmable gain instrumentation amplifier is connected to the first measurement node, and the output of the first programmable gain instrumentation amplifier is representative of the temperature sensed by the first resistance temperature detector, controlling the voltage output of the first programmable gain instrumentation amplifier that is indicative of a temperature of the first resistance temperature detector by:

(a) setting the predetermined source voltage to a desired operational supply voltage;

(b) setting the gain of the first programmable gain instrumentation amplifier to a desired operational gain value;

(c) bringing the resistance temperature detector to a known temperature;

(d) measuring a voltage output from the first programmable gain instrumentation amplifier;

(e) storing the measured output voltage in an electronic memory in association with the known temperature;

(f) repeating steps (c) through (e) to store a plurality of associations between known temperatures and corresponding measured output voltages; and (g) utilizing the stored associations to calibrate the circuit for thermal variations.

10. The method of claim 9, wherein the step of bringing the resistance temperature detector to a known temperature comprises utilizing an externally controlled heating device that has been independently calibrated.

11. The method of claim 10, wherein the externally controlled heating device comprises a Peltier device.

12. The method of claim 10, wherein the externally controlled heating device comprises a resistive heater.

13. The method of claim 9, wherein the step of utilizing the stored correlations comprises utilizing a look up table for the plurality of known temperatures.

14. The method of claim 9, wherein the step of utilizing the stored correlations comprises calculating a suitable curve to interpolate output voltage between the known temperatures.

15. A system of controlling the temperature of a microfluidic device for performing biological reactions, comprising tunable temperature measurement circuit comprising:

a source node maintained at a predetermined source voltage;

a ground node maintained at a predetermined ground voltage;

a bridge circuit comprising:
    a first resistance temperature detector connected between the source node and a first measurement node,
    a first reference resistor connected between the first measurement node and the ground node,
    a potentiometer connected between the source node and a reference node, and
    a scaling resistor connected between the reference node and the ground node;
a bypass circuit connected between the first measurement node and the ground node, wherein the bypass circuit pulse width modulates a current passing through the first resistance temperature detector, and a first programmable gain instrumentation amplifier wherein a first input to the first programmable gain instrumentation amplifier is connected to the reference node, a second input to the first programmable gain instrumentation amplifier is connected to the first measurement node, and the output of the first programmable gain instrumentation amplifier is representative of the temperature sensed by the first resistance temperature detector.

16. The system of controlling the temperature of a microfluidic device for performing biological reactions of claim 15, further comprising:

a second resistance temperature detector connected between the source node and a second measurement node, a second reference resistor connected between the second measurement node and the ground; and a second programmable gain instrumentation amplifier wherein a first input to the second programmable gain instrumentation amplifier is connected to the reference node, a second input to the second programmable gain instrumentation amplifier is connected to the second measurement node, and the output of the second programmable gain instrumentation amplifier is representative of the temperature sensed by the second resistance temperature detector.

17. The system of controlling the temperature of a microfluidic device for performing biological reactions of claim 15, further comprising a bridge adjustment controller configured to:

(a) set the resistance value of the potentiometer to a first resistance value;

(b) set the gain of the first programmable gain instrumentation amplifier to a first gain value;

(c) measure the voltage output from the first programmable gain instrumentation amplifier;

(d) in the case that the measured voltage is above a predetermined target value, adjust the resistance value of the potentiometer in a first direction;

(e) in the case that the measured voltage is below the predetermined target value, adjust the resistance value of the potentiometer in a direction opposite to the first direction; and (f) repeat steps (c) through (e) until the measured voltage from the first programmable gain instrumentation amplifier is equal to the predetermined target value.

\* \* \* \* \*